United States Patent
Anegawa et al.

(10) Patent No.: US 8,060,578 B2
(45) Date of Patent: Nov. 15, 2011

(54) OUTPUT INFORMATION MANAGEMENT SYSTEM

(75) Inventors: Takehiko Anegawa, Tokyo-to (JP); Yoshihiro Yano, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 980 days.

(21) Appl. No.: 10/532,952

(22) PCT Filed: Sep. 24, 2004

(86) PCT No.: PCT/JP2004/013956
§ 371 (c)(1),
(2), (4) Date: Apr. 27, 2005

(87) PCT Pub. No.: WO2005/031560
PCT Pub. Date: Apr. 7, 2005

(65) Prior Publication Data
US 2006/0075460 A1    Apr. 6, 2006

(30) Foreign Application Priority Data

Sep. 25, 2003 (JP) ................. 2003-333268
Feb. 26, 2004 (JP) ................. 2004-050848

(51) Int. Cl.
*G06F 15/16* (2006.01)
*H04N 1/40* (2006.01)
(52) U.S. Cl. .................. 709/217; 358/3.28
(58) Field of Classification Search .......... 709/219; 358/3.28; 399/80
See application file for complete search history.

(56) References Cited

U.S. PATENT DOCUMENTS

| 6,807,388 | B1 * | 10/2004 | Kojima et al. ........... 399/80 |
| 2003/0107771 | A1 * | 6/2003 | Shibata ............... 358/3.28 |
| 2003/0154395 | A1 * | 8/2003 | Miura et al. ............ 713/200 |
| 2003/0179399 | A1 * | 9/2003 | Matsunoshita ........ 358/1.13 |

FOREIGN PATENT DOCUMENTS

| JP | 6-22131 | 1/1994 |
| JP | 7-49645 | 2/1995 |
| JP | 7-212602 | 8/1995 |
| JP | 9-44432 | 2/1997 |
| JP | 10-016355 A | 1/1998 |
| JP | 2000-10441 | 1/2000 |
| JP | 2000-98833 | 4/2000 |
| WO | WO00/51338 | 8/2000 |

* cited by examiner

*Primary Examiner* — Joseph Avellino
*Assistant Examiner* — Jeong S Park
(74) *Attorney, Agent, or Firm* — Ladas & Parry LLP

(57) ABSTRACT

There are provided an output information management system and a method therefor that prevent an output device, which outputs information onto media from being used by an unauthorized third party and allow efficient investigation of an unauthorized activity by an authorized user. A server which constitutes the output information management system stores ID information stored on an IC card for a user and information to be outputted by the output device in an output information database in association with each other. Thus, in case that an unauthorized output is performed, specific evidence as to who outputted what information on the output device is preserved. Therefore, an unauthorized output can be deterred and, if by any chance an unauthorized activity is committed, the activity can be efficiently identified.

4 Claims, 16 Drawing Sheets

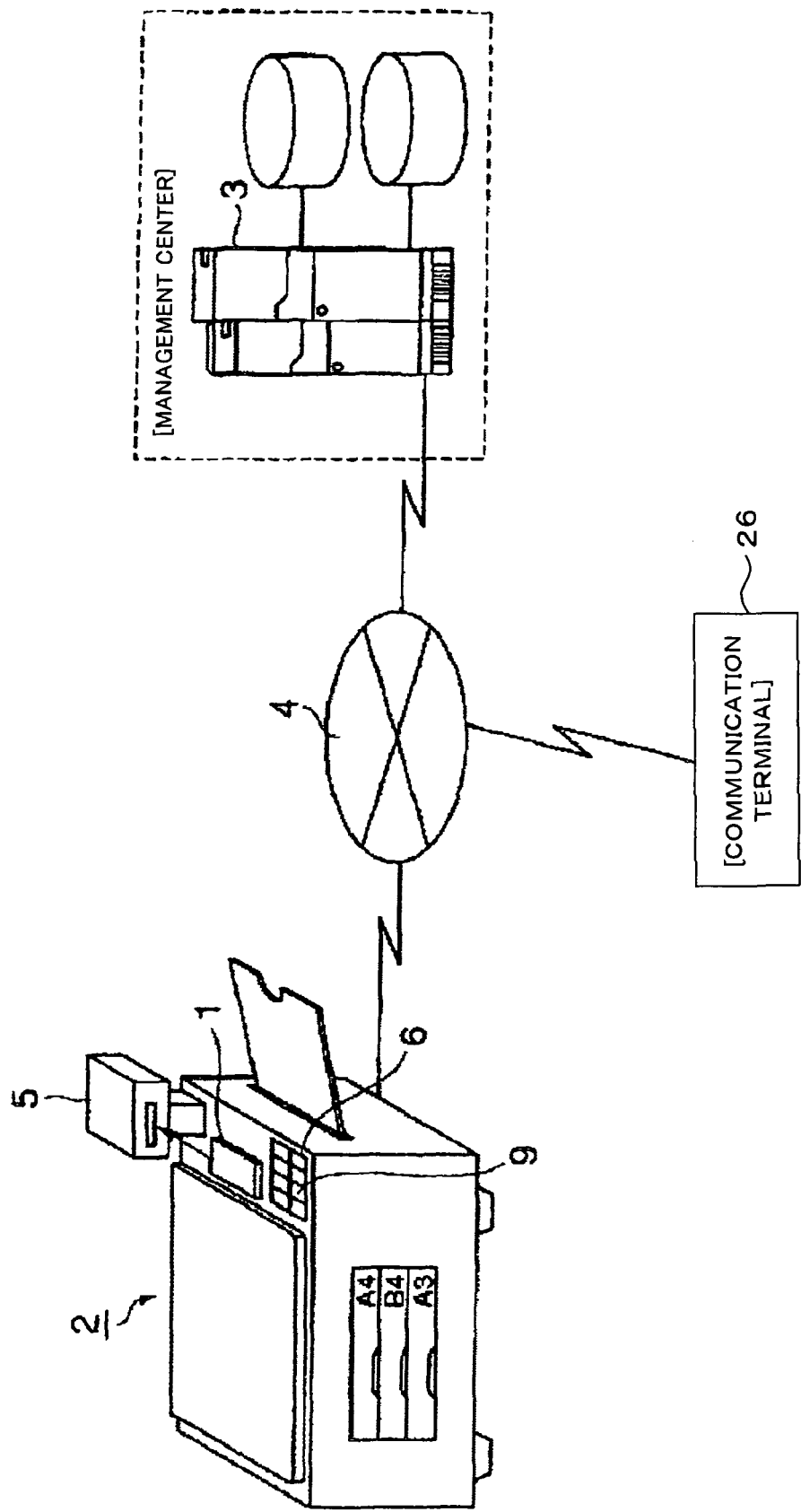

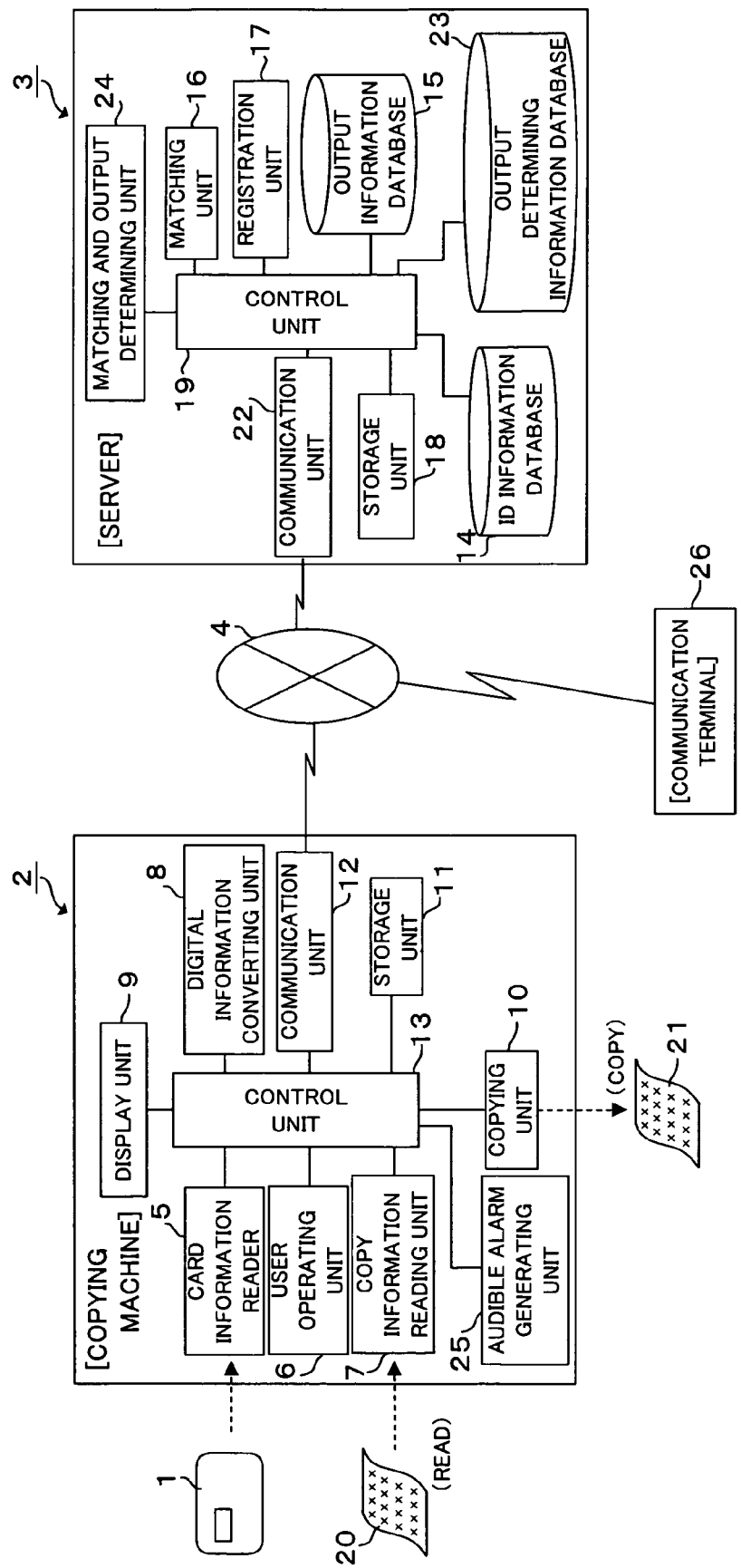

FIG. 3

PROHIBITED INFORMATION LIST

- INFORMATION INCLUDING A PROHIBITED CHARACTER STRING (SUCH AS "FOR INTERNAL USE ONLY" OR "CONFIDENTIAL"

- INFORMATION INCLUDING MORE THAN 10 PERSONAL NAMES

- INFORMATION INCLUDING MORE THAN 10 TELEPHONE NUMBERS

| TYPE OF EMPLOYMENT | OUTPUT ALLOWED TIME | DEPARTMENT NAME | OUTPUT ALLOWED PLACE |
|---|---|---|---|
| FULL-FLEDGED | 7:00~0:00 | GENERAL AFFAIRS | FLOOR A |
| | | HUMAN RESOURCES | FLOOR B |
| | | DEVELOPMENT | FLOOR C |
| | | ⋮ | ⋮ |
| PART-TIMER | 9:00~17:00 | GENERAL AFFAIRS | FLOOR A |
| | | HUMAN RESOURCES | FLOOR B |
| | | DEVELOPMENT | FLOOR C |
| | | ⋮ | ⋮ |

FIG. 5

| PRINTER ID | INSTALLATION LOCATION | EMPLOYEE ID |
|---|---|---|
| PRINTER A | A COMPANY DEVELOPMENT FLOOR | P001~P100 |
| PRINTER B | B COMPANY DEVELOPMENT FLOOR | P101~P200 |
| PRINTER C | C COMPANY DEVELOPMENT FLOOR | P201~P300 |
| ⋮ | ⋮ | ⋮ |

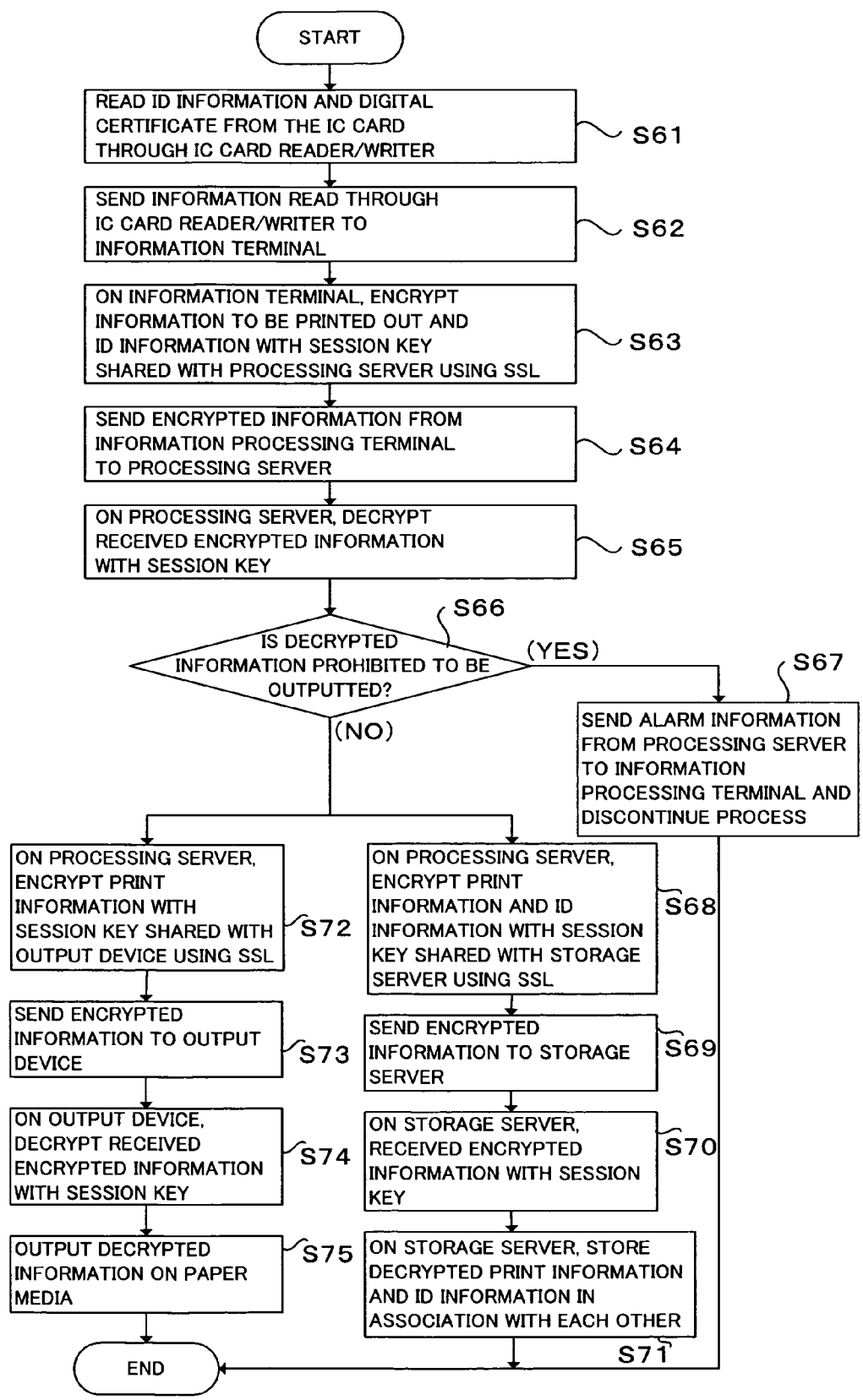

OUTPUT INFORMATION MANAGEMENT SYSTEM

TECHNICAL FIELD

The present invention relates to an output information management system that prevents valuable information from being outputted illegally onto a medium by an output device such as a copying machine and a printer capable of outputting information onto a medium and from being leaked and that, in the event of unauthorized output, enables a person who illegally outputted information to be identified.

BACKGROUND ART

There is the need for preventing leakage of information such as by a third party using an output device such as a copying machine or a printer capable of outputting information onto paper media to illegally output confidential information onto paper media and sneaking the paper media out, and also unauthorized use of an output device by an unauthorized third party. For that purpose, the use of output devices is often controlled by performing authentication of personal identification by using information storage media such as control cards held by authorized users before permitting the use of the output devices.

There are known conventional techniques in which storage media such as control cards are used for controlling the use of output devices (for example, see Patent Documents 1 and 2).

These conventional techniques for controlling the use of output devices can prevent the use of an output device by third parties other than authorized users who hold information storage media such as control cards. However, a problem with these conventional techniques is that if an authorized user of the output device attempts to use the output device to illegally output confidential information onto paper media with the intention to steal the information, the illegal act cannot be prevented.

Moreover, in many of such cases, no evidence of illegal activities remains. Accordingly, the conventional techniques have little effect of ensuring security because it is difficult to prevent such illegal activities by insiders.

Therefore, the conventional techniques for preventing unauthorized use have no effect of preventing an unauthorized use by authorized users of output devices and one can only rely on morals of authorized users of the output devices to prevent unauthorized use.

[Patent Document 1] Japanese Patent Application Laid-Open No. 2000-10441

[Patent Document 2] Japanese Patent Application Laid-Open No. 2000-98833

DISCLOSURE OF INVENTION

Problems To Be Solved By The Invention

An object of the present invention is to provide an output information management system that can prevent an output device capable of outputting information on media from being used by third parties other than authorized users who hold information storage media such as cards for controlling the use of the output device.

Another object of the present invention is to provide an output information management system that can preserve specific evidence as to who outputted what information on an output device in the event that a malicious activity such as theft of valuable information by outputting it onto a medium was done even by an authorized user of the output device, thereby deterring unauthorized activities and enabling efficient investigation of unauthorized activities, if any.

Means For Solving The Problems

According to one aspect of the present invention, there is provided an output information management system including an information storage medium for a user, an output device which outputs information onto media, and a server communicably connected with the output device through a communication network, wherein the information storage medium has a memory in which unique information is stored; the output device has a reading unit which reads the unique information from the information storage medium and a unit which transmits information to be outputted onto media to the server in association with the unique information; and the server has a database for storing the information received from the output device in association with the unique information.

Also, there is provided a server connected through a communication network with an output device which outputs information onto media. The server includes a database in which output prohibited information prohibited to be outputted on the output device or output permitted information permitted to be outputted on the output device is registered; a receiving unit which receives output information to be outputted onto the media and the unique information of the user; a storage unit which stores the output information and the unique information received from the output device in a database in association with each other; a matching unit which matches the output information received from the output device with the information registered in the database; and a unit which transmits alarm information to the output device or an information processing terminal for an administrator or stops the output, if the matching unit determines as the result of the matching that the output information matches the output prohibited information or does not match the output permitted information.

The output information management system or the server configured as described above stores unique information from the information storage medium of a user and information to be outputted onto media on the output device into the database in association with each other. Thus, in case that an unauthorized output is performed, specific evidence as to who outputted what information is preserved. Therefore, an unauthorized output can be prevented and, if by any chance an unauthorized activity is committed, the activity can be efficiently identified.

In one mode of the output information management system, the server includes a database in which output prohibited information prohibited to be outputted on the output device or output permitted information permitted to be outputted on the output device is registered, a matching unit which matches information received from the output device with the information registered in the database, a unit which transmits alarm information to the output device or an information terminal for an administrator or stops the output, if the matching unit determines as the result of the matching that the information matches the output prohibited information or does not match the output permitted information. Thus, the output information management system can properly determine whether information is information permitted to be outputted on the output device or not, from the database in which output prohibited information or output permitted information is registered.

In one embodiment of the output information management system described above, the database contains output prohibited information or output permitted information associated with each individual output device and the matching unit matches information received from the output device with the output prohibited information or output permitted information that is associated with the output device. Thus, determination as to whether information that a user is attempting to output should be permitted or not can be made on the basis of the location where the output device is installed. For example, if each department has one output device installed on the department floor, it is possible to permit a user to output information only on the output device on the floor of the department to which the user belongs. By making determination as to whether output should be permitted or not on an individual output device basis in this way, leakage of confidential information can be prevented and security can be improved, especially in a case where different kinds of confidential information on different customers are handled on different floors.

According to another aspect of the present invention, there is provided an output information management method for an output information management system including an information storage medium held by a user, an output device which outputs information onto media, and a server communicably connected with the output device thorough a communication network, including the steps of: reading unique information stored on a memory of the information storage medium by the output device; transmitting information outputted by the output device from the output device to the server in association with the unique information; and storing the unique information and the information associated with the unique information in a database of the server.

By implementing the output information management method on a computer, the same effects as those of the output information management system described above can be achieved.

According to yet another aspect of the present invention, there is provided an output information management system including an information storage medium, an information processing terminal having a reader/writer capable of reading information stored on the information storage medium, an output device which is connected with the information processing terminal so as to be capable of receiving information from the information processing terminal and outputs information received from the information processing terminal onto paper media, and a server communicably connected with the output device, wherein the information storage medium has a memory on which ID information identifying a user is stored; the reader/writer has a reading section for reading ID information stored on the information storage medium; the information processing terminal has a unit which transmits ID information read by the reader/writer and output information to be outputted onto paper media on the output device; the output device has a unit which transmits ID information and output information received from the information processing terminal to the server, and the server has a unit which stores the ID information and the output information received from the output device in an database in association with each other.

In the output information management system configured as described above, information outputted from the information processing terminal used by a user onto paper media on the output device can be stored in the database in association with the ID information of the user. That is, in case an unauthorized output is performed from the information processing terminal, specific evidence as to who outputted what information is preserved. Therefore, an unauthorized activity can be prevented and, if by any chance an unauthorized activity is committed, the activity can be efficiently identified.

According to yet another aspect of the present invention, there is provided an output information management system including an information storage medium, an information processing terminal having a reader/writer capable of reading information stored on the information storage medium, a server which is connected with the information processing terminal so as to be capable of receiving information from the information processing terminal and is communicably connected with an output device, and an output device which outputs information received from the information processing terminal through the server onto paper media, wherein the information storage medium has a memory on which ID information identifying a user is stored, the reader/writer has a reading section for reading ID information stored on the information storage medium; the information processing terminal has a unit which transmits ID information read by the reader/writer and output information to be outputted onto paper media on the output device to the server; and the server has an output determining information database in which output prohibited information prohibited to be outputted on the output device or output permitted information permitted to be outputted on the output device is registered; a matching unit which matches the output information received from the information processing terminal with the information registered in the output determining information database; an alarm information transmitting unit which transmits alarm information to the output device if the matching unit determines as the result of the matching that the output information matches the output prohibited information or does not match output permitted information; and an output information transmitting unit which transmits the output information to the output device if the matching unit determines as the result of the matching that the output information does not match the output prohibited information or matches the output permitted information.

Also, there is provided a server communicably connected with an output device which outputs information onto paper media, wherein the server has an output determining information database in which output prohibited information prohibited to be outputted on the output device or output permitted information permitted to be outputted on the output device is registered; an output information database in which ID information and output information received from the information processing terminal are stored in association with each other; a receiving unit which receives ID information identifying a user and output information to be outputted on the paper media; a matching unit which matches the output information received by the receiving unit with the information registered in the output determining information database; an alarm information transmitting unit which transmits alarm information to the output device if the matching unit determines as the result of the matching that the output information matches the output prohibited information or does not match the output permitted information; and an output information transmitting unit which transmits the output information to the output device if the matching unit determines as the result of the matching that the output information does not match the output prohibited information or matches the output permitted information; and the server stores ID information received by the receiving unit in association with output information that is determined not to match the output prohibited information or determined to match the output permitted information as the result of the matching by the matching unit.

The output information management system or the server configured as described above can properly determine whether information that a user is trying to output onto paper media is prohibited to be outputted, by referring to the output determining information database. If the information is prohibited to be outputted, alarm information is transmitted to the output device to notify the user that the output of the information is prohibited. Thus, if information is prohibited to be outputted, the output operation can be stopped before the user outputs the information on the output device. Consequently, leakage of information can be prevented and security can be improved.

In one embodiment of the output information management system, the server further includes an output information database in which ID information and output information received from the information processing terminal are stored in association with each other, and a unit which stores ID information received from the information processing terminal and output information that is determined not to match the output prohibited information or to match the output permitted information by the matching unit in the output information database in association with each other. With this embodiment, if information that is not registered in the output determining information database but yet should be prohibited from being outputted is outputted, specific evidence as to who outputted what information on the output device is preserved. Therefore, an unauthorized output can be prevented and, if by any chance an unauthorized output is committed, it can be identified efficiently.

According to yet another aspect of the present invention, there is provided an output information management system including an information storage medium, an information processing terminal having a reader/writer capable of reading information from the information storage medium, a processing server which is connected with the information processing terminal so as to be capable of receiving information from the information processing terminal and is communicably connected with the output device, a storage server which stores information permitted by the processing server to be outputted, and an output device which outputs information received from the information processing terminal onto paper media, wherein the information storage medium has a memory on which ID information identifying a user is stored; the reader/writer has a reading section for reading ID information stored on the information storage medium; the information processing terminal has a unit which transmits the ID information read by the reader/writer and output information to be outputted onto paper media on the output device to the processing server; the processing server has an output determining information database in which output prohibited information prohibited to be outputted on the output device or output permitted information permitted to be outputted on the output device is registered, a matching unit which matches output information received from the information processing terminal with the information registered in the output determining information database; an alarm information transmitting unit which transmits alarm information to the output device if the matching unit determines as the result of the matching that the output information matches the output prohibited information or does not match the output permitted information; and a transmitting unit which transmits the output information to the output device and transmits the output information and the ID information to the storage server, if the matching units determines as the result of the matching that the output information does not mach the output prohibited information or matches the output permitted information; and the storage server further includes an output information database in which ID information and output information received from the information processing terminal are stored in association with each other, and a unit which stores the ID information and output information received from the processing server in the output information database in association with each other.

In the output information management system configured as described above, the processing server which determines whether information that a user is trying to output is prohibited to be outputted and storage server for storing ID information identifying the user in association with output information are provided separately. With this configuration, determination whether output should be permitted can be made on the processing server centrally and efficiently, and output information, which consumes a large amount of memory, can be stored on storage servers provided at a number of locations.

In one mode of the output information management system, the output determining information database contains output prohibited information or output permitted information associated with each individual output device and the matching unit matches information received from the information processing terminal with the output prohibited information or output permitted information associated with the output device on which the information is to be outputted. With this aspect, determination as to whether output of information which a user is trying to output should be permitted can be made on an individual output device basis, on the basis of the installation location of the output device, for example.

In another aspect of the output information management system, the information storage medium is an IC card.

EFFECT OF THE INVENTION

The output information management system of the present invention has the advantages that an output device can be prevented from being used by an unauthorized user and an unauthorized use by an authorized user can be readily identified by querying the database to find out who copied what information, because the output information management system performs information matching by using unique information stored on an information storage medium held by the user before allowing the use of the output device and also registers information such as copy information or output information in the database in association with information identifying users of the output device.

Furthermore, the output information management system of the present invention has the advantage that an unauthorized use by an authorized user can be readily identified by referring to information stored in the database to find out who printed out what information, because the output information management system stores information sent to the output device such as a printer from an information processing terminal such as a personal computer, in the database of the server in association with ID information identifying the user.

Moreover, the output information management system of the present invention can stop an output operation before a user outputs information on an output device if the information is prohibited to be outputted. That is, the output information management system has the advantage that it can prevent leakage of information and improve security.

Furthermore, the output information management system of the present invention has the advantage that determination as to whether output of information should be permitted or not is efficiently made at a central processing server provided at a single location and output information, which consume a large amount of memory, is stored storage servers provided at a number of locations.

BRIEF DESCRIPTION OF THE DRAWINGS

FIG. 1 is a diagram illustrating an overview of an output information management system according to a first embodiment of the present invention;

FIG. 2 is a system block diagram of the output information management system according to the first embodiment;

FIG. 3 is a diagram schematically showing a structure of prohibited information list;

FIG. 4 is a diagram schematically showing a structure of an output restricting table based on attributes of employees;

FIG. 5 is a diagram schematically showing a structure of an output restricting table based on installation location of a printer;

FIG. 17 is a flowchart of a process performed by the output information management system according to the fourth embodiment.

DETAILED DESCRIPTION OF THE PREFERRED EMBODIMENTS

An output information management system according to embodiments of the present invention will be described below with reference to the accompanying drawings.

First Embodiment

Figure 6:
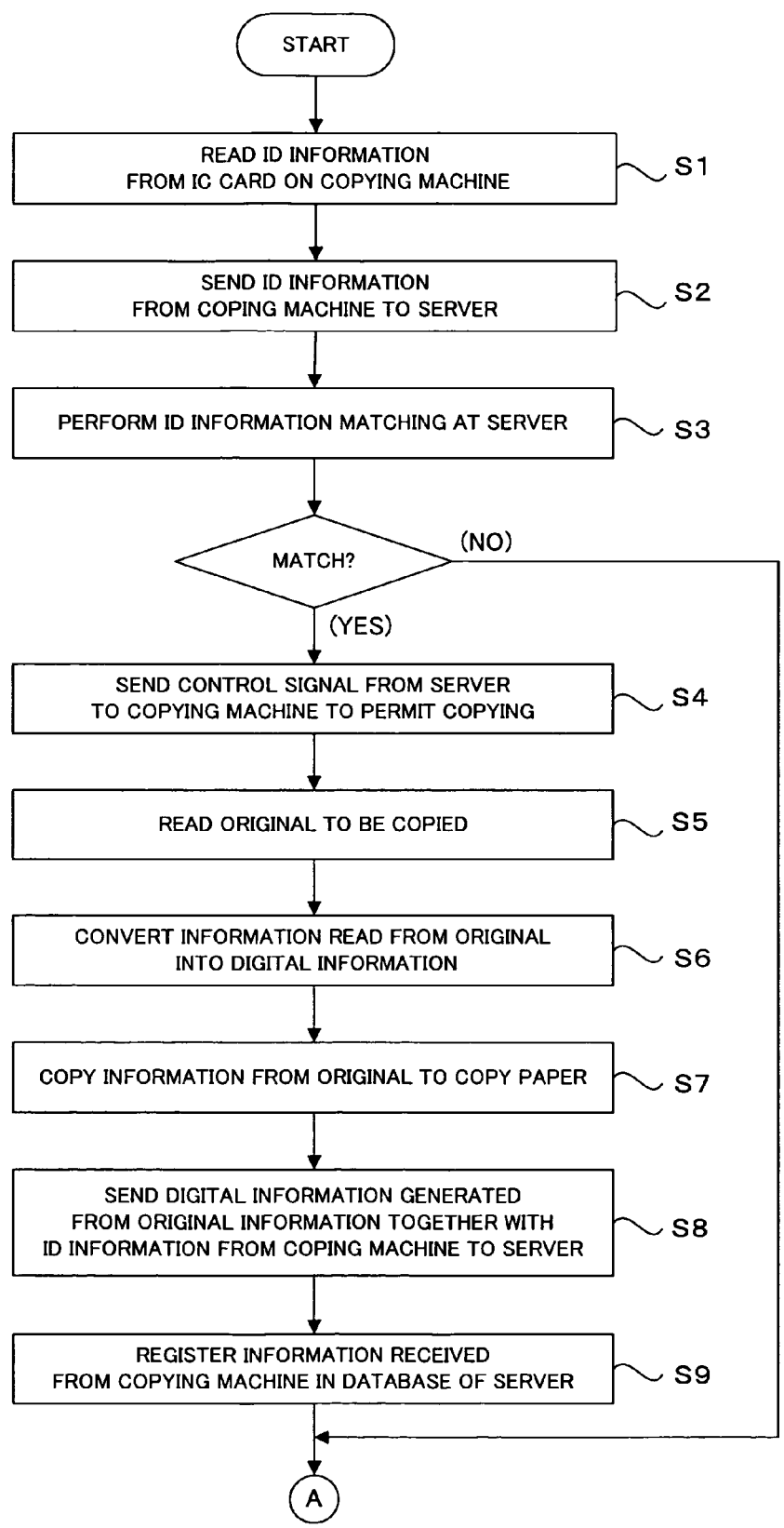
FIG. 6 is a flowchart of a process performed by the output information management system according to the first embodiment.
Figure 7:
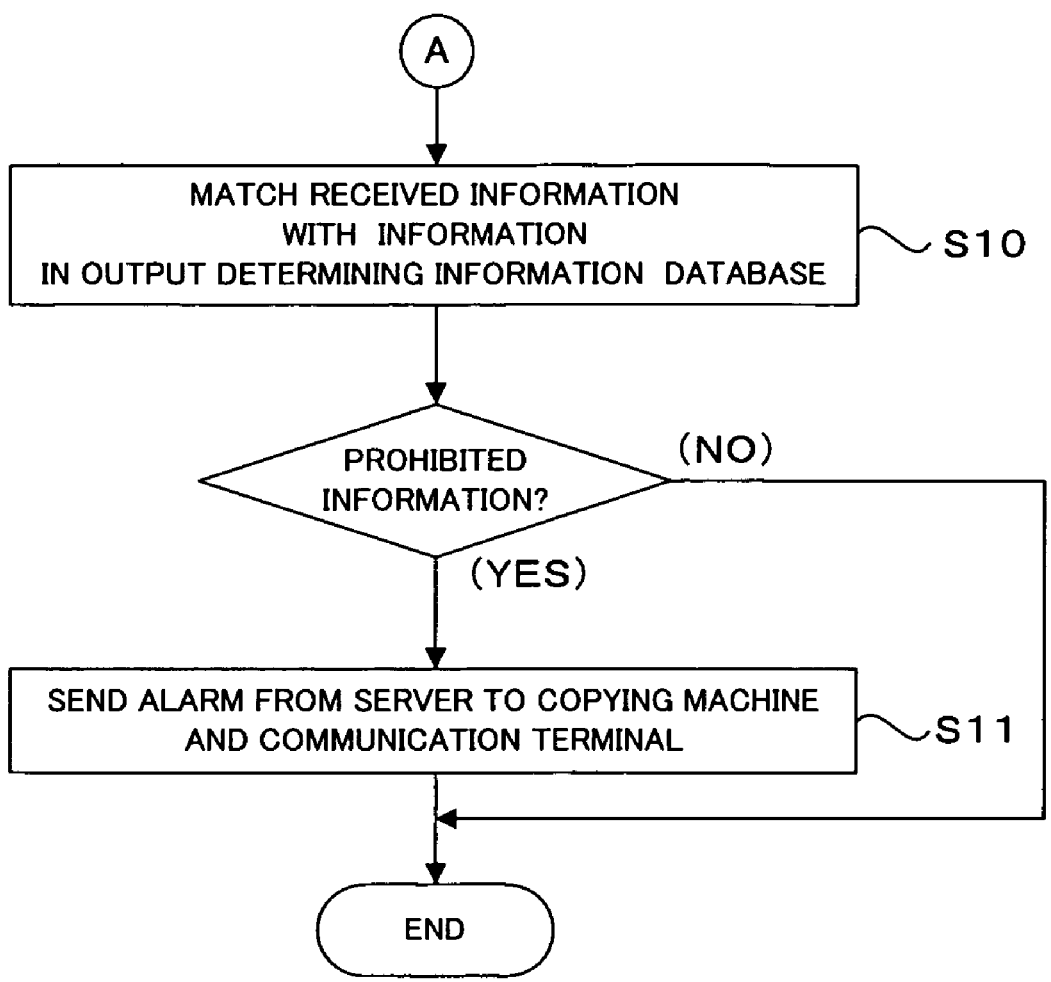
FIG. 7 is a flowchart of another process performed by the output information management system according to the first embodiment.

Referring to FIGS. 1 to 7, a first embodiment of the present invention will be described. FIG. 1 is a diagram illustrating an overview of an output information management system according to a first embodiment of the present invention. FIG. 2 is a system block diagram of the output information management system according to the first embodiment. FIG. 3 is a diagram schematically showing a structure of a prohibited information list. FIG. 4 shows an output restricting table based on attributes of employees. FIG. 5 shows an output restricting table based on device installation locations. FIGS. 6 and 7 are flowcharts of a process performed by the output information management system according to the first embodiment of the present invention.

[Output Information Management System]

An overview of the output information management system will be described first with reference to FIGS. 1 and 2.

The output information management system according to the first embodiment of the present invention includes an IC card 1, which is an information recording medium for a user, a copying machine 2, which is an output device outputting information on paper media, and a management server 3 connected with the copying machine 2 through a communication network 4 in a manner they can communicate with each other.

Provided on the IC card 1, which is an information storage medium, is a storage formed by a memory in which ID information, which is unique information, is stored.

The copying machine 2 includes a card information reader 5 which reads ID information, or unique information, stored in the memory of the IC card 1, a user operating unit 6 on which a user performs operations such as input of an instruction, a copy information reading unit 7, which scans an original to be copied to read information from the original as image information, a digital information converting unit 8, which converts image information read by the copy information reading unit 7 into digital information, a display unit 9, a copying unit 10, which copies information from an original to a paper medium, a storage unit 11, a communication unit 12, which communicates with the server 3 via the communication network 4, a control unit 13, and an audible alarm generating unit 25.

The server 3 includes a communication unit 22, which communicates with the copying machine 2 via the communication network 4, an ID information database 14 in which ID information is registered beforehand for matching with the ID information stored in the storage unit of an IC card 1 when the ID information is provided from the copying machine 2, an output information database 15, which stores information outputted as a copy from the copying machine 2 as digital data in association with ID information, a matching unit 16, which matches ID information received from the copying machine 2 with ID information contained in the ID information database 14, a registration unit 17, which registers ID information received from the copying machine 2 in association with copied information in the output information database 15, a storage unit 18, a control unit 19, an output determining information database 23, and an matching and output determining unit 24.

Information contained in the ID information database 14 includes information, such as the names of users and the name of the departments to which the users belong, that identifies individual users, in association with the ID information.

The ID information may be personal identification numbers, such as employee numbers, used for managing the employees in an organization, and the system may be managed as part of an information system interoperable with other systems.

The output determining information database 23 contains output prohibited information prohibited to be outputted on the copying machine 2, which is an output device, and output permitted information permitted to be outputted on the output device.

The matching and output determining unit 24 has the function of matching information received from the copying machine 2, the output device, with information in the output determining information database 23. If the matching and output determining unit 24 determines from the matching that the information matches output prohibited information or does not match output permitted information, the control unit 19 transmits alarm information to the copying machine 2 or a communication terminal 26, or the control unit 19 provides control to stop the output. The communication terminal 26 may be an information processing terminal used by an administrator who controls the security of the area where the copying machine 2 is installed. Details of the method performed by the matching and output determining unit 24 to determine whether output should be permitted or not will be described later.

The alarm information may be transmitted from the server 3 to the copying machine 2 or the communication terminal 26 as an e-mail message to a particular administrator.

[Output Determining Method]

A method performed by the matching and output determining unit 24 of the server 3 to determine whether output should be permitted or not will be described below with reference to FIGS. 3 to 5.

The output determining database 23 contains output prohibited information or output permitted information as described above. Specifically, the output determining database 23 contains information such as the prohibited information list shown in FIG. 3 and the output restricting tables shown in FIGS. 4 and 5.

The following is the description of how the matching and output determining unit 24 determines from a prohibited information list as shown in FIG. 3 as to whether or not output should be permitted. Information that the server 3 receives from the copying machine 2 is image information read by the copy information reading unit 7 or text information converted from the image information by an OCR (Optical Character Reader) or the like.

The prohibited information list contains conditions for prohibiting output of information received from the copying machine 2, as shown in FIG. 3. In particular, the matching and output determining unit 24 matches information received from the copying machine 2 with the conditions listed on the prohibited information list. If the information matches at least one of conditions on the prohibited information list, such as "Information including a prohibited character string", "Information including more than 10 personal names", and "Information including more than 10 telephone numbers", the matching and output determining unit 24 determines that the output of the information should be prohibited and transmits alarm information to the copying machine 2 or the communication terminal 26 or performs control to stop the output.

Prohibited character strings herein may be symbols or character strings such as "Internal use only" or "Confidential" printed on a document for indicating that the document is a classified document. The matching and output determining unit 24 searches through the text information received from the copying machine 2 and, if it finds a prohibited character string, determines that the output of the information should be prohibited. Prohibited character strings are often printed in a distinctive color such as red instead of black. In that case, if the matching and output determining unit 24 determines that the image information received from the copying machine 2 contains a prohibited character string printed in a specific color, the matching and output determining unit 24 determines that the output of the information should be prohibited. In this way, the output of information containing a prohibited character string is prohibited and the server 3 can readily detect a person who tried to output and sneak confidential information.

Conditions listed on the prohibited information list are not limited to those shown in FIG. 3; any conditions may be specified on the list.

The personal names are full names, and accordingly the server 3 can readily detect a person who tried to output and sneak information containing more than 10 personal names or telephone numbers. That is, the server 3 can deter leakage of personal information.

The following is the description of a process performed by the matching and output determining unit 24 for determining whether to permit output of information, in accordance with an output restricting table based on attributes of employees as shown in FIG. 4. As shown, the output restricting table based on attributes of employees consists of the type of employment, output allowed time, department name, and output allowed place. "Type of employment" indicates whether an employee is a full-fledged or part-time employee, which can be determined from ID information received from the copying machine 2 and ID information database 14. "Output allowed time" indicates a time slot during which the full-fledged or part-time employee is allowed to output information. In this embodiment, the full-fledged employee can output information in the time slot from 7:00 to 0:00, which is relatively long, allowing for overtime work, whereas the part-timer can output information only in the business hours from 9:00 to 17:00. The "type of employment" column may also contain job titles. "Department name" represents the department to which the employee belongs. "Output allowed place" represents the floor of the department to which the employee belongs. An employee can output information only on a copying machine 2 installed on the floor of the department to which he or she belongs.

The matching and output determining unit 24 first determines the type of employment and department of the employee, from the ID information, received from the copying machine 2, and the ID information database 14. Then, the matching and output determining unit 24 refers to the output restricting table shown in FIG. 4 by using the type of employment as a key. If the current time is beyond the output-allowed-time-slot for the employee, the matching and output determining unit 24 determines that output should be prohibited. Also, the matching and output determining unit 24 refers to the output restricting table shown in FIG. 4 by using the type of employment as a key and, if it finds that the copying machine 2 is placed in a place other than the specified output allowed place, then the matching and output determining unit 24 determines that the output should be prohibited. In this way, output is prohibited if the current time or the location of the copying machine 2 does not match the conditions specified on the output restricting table. Thus, the server 3 can readily detect a person who tried to output information outside duty hours or on a copying machine 2 on a floor other than the floor of the department to which the person belongs.

Described below is a process performed by the matching and output determining unit 24 for determining whether output should be permitted or not by referring to an output restricting table based on the device installation locations as shown in FIG. 5. The information that the server 3 receives from a copying machine 2 includes, in addition to the image or text information read by the copy information reading unit 7, information identifying the copying machine 2, for example a printer ID. The assumption in this example is that the copying machine 2 is a printer.

The output restricting table based on the installation locations of the copying machine consists of printer ID, installation place, and employee ID columns as shown. A "printer ID" identifies a printer. An "installation place" is the location indicated by the printer IDw here the printer is installed. An "employee ID" identifies an employee, which can be determined from ID information received from the copying machine 2 and the ID information database 14.

The matching and output determining unit 24 first determines the printer ID of the copying machine 2 from the information received from the copying machine 2. The matching and output determining unit 24 also determines the employee ID from the ID information received from the copying machine 2 and ID information database 14. Then, the matching and output determining unit 24 refers to the output restricting table shown in FIG. 5 using the printer ID as a key. If the determined employee ID does not match any of the employee IDs, the matching and output determining unit 24 determines that the output should be prohibited. In this way, by prohibiting output by an employee whose employee ID does not match any of those associated with the printer in the output restricting table, the server 3 can readily detect the person who tried to output information at a place other than the floor of the department to which he or she belongs. It is advantageous to use an output restricting table as shown to prohibit even a full-fledged employee from outputting information in a place other than the floor of the department to which he or she belongs, especially if different customer documents are dealt with on different floors.

[Output Information Management Process]

Referring to FIGS. 6 and 7, a process and an output management method performed by the output information management system according to the embodiment of the present invention will be described below.

First, a user of a copying machine 2 inserts an IC card 1 belonging to him or her in a card slot of the card information reader 5 to scan the ID information stored in the memory of the IC card 1 through the card reader 5 (step S1). Then, the copying machine 2 transmits the ID information read by the card reader 5 to the server 3 through the communication network 4 from the communication unit 12 (step S2). The server 3 receives the ID information and the matching unit 16 in the server 3 matches the ID information received at the server 3 with ID information in the ID information database 14 (step S3). If the matching by the matching unit 16 finds a match, the server 3 transmits to the copying machine 2 a signal permitting the copying by the copying machine 2 and causes the control unit 13 of the copying machine 2 to control the copying machine 2 to place it in a copy-capable mode (step S4). On the other hand, if the matching by the matching unit 16 does not find a match, the process is discontinued. In that case, the server 3 may transmit a signal to the copying machine 2 to indicate the mismatch over the communication network 4.

Then, the user sets an original 20 he or she wants to copy on an original setting plate and the copy information reading unit 7 reads the original (step S5). The information read from the original by the copy information reading unit 7 is converted by the digital information converting unit 8 into digital information (step S6). The information is copied by the copying unit 10 to copy paper 21 (step S7). The copying may be performed immediately after the original is read.

The digital information generated from the original information is associated with the ID information read by the card information reader 5 and is transmitted to the server 3 over the communication network 4 (step S8). Device identification information of the copying machine 2 (output device) and information about copy time and the location where the copy is performed may be associated with the ID information and transmitted to the server 3 so that more detailed copy information can be registered. Then, the server 3 registers the ID information received from the copying machine 2 and the digital information representing the original information associated with the ID information in the output information database 15 (step S9). The output information database 15 stores ID information and digital information representing the original information associated with the ID information in time-series order.

The information received at the server 3 is matched against information registered in the output determining information database 23 (step S10). If the matching shows that the information is prohibited to be copied or outputted, or the information is not permitted to be copied or outputted, the server 3 transmits alarm information to the copying machine 2 and communication terminal 26 (step S11).

Thus, the person who used the copying machine 2 can be identified from the copy information stored in the output information database 15 in association with the ID information and from the personal information stored in the ID information database 14 in association with the ID information. Furthermore, details on the user of the copying machine 2 such as who copied what information can be readily determined by checking copy information stored in the output information database 15 in association with the ID information.

The information storage medium is not limited to an IC card; any of various types of information storage media that have memory capable of storing unique information such as ID information can be used. The present invention can be applied to, besides copying machines, various types of output devices capable of outputting information on paper media. Preferably, an encryption system is used for ensuring the security of information communicated between the copying machine 2, which is an output device, and the server 3.

For example, a digital certificate may be stored in the memory of an IC card, or information storage medium. After the digital certificate on the IC card is read by the copying machine 2 and transmitted to the server 3 in an early stage of the process described above, the server 3 verifies the digital certificate. If it is determined through the verification that copying should be permitted, the copying on the copying machine 2 is permitted.

After this step, communication between the copying machine 2 and the server 3 is performed by using SSL (Secure Socket Layer). "SSL" is a technology for authenticating a client and/or server with encryption and a public-key-based digital certificate. With SSL, a digital certificate is sent from the copying machine 2 to the server 3 before ID information and digital information representing original information, associated with the ID information, are transmitted. A private key paired with the public key in the digital certificate may be used for attaching digital signature. Furthermore, the information consisting of the ID information and the digital information representing original information associated with the ID information may be divided into pieces of information and then sent from the copying machine 2 to more than one server. These techniques are disclosed in Japanese Patent Application Laid-Open No. 2000-59355, Encryption System. Distributing and storing the information over more than one server is advantageous in that a higher level of security of data storage can be ensured.

Second Embodiment

Figure 8:
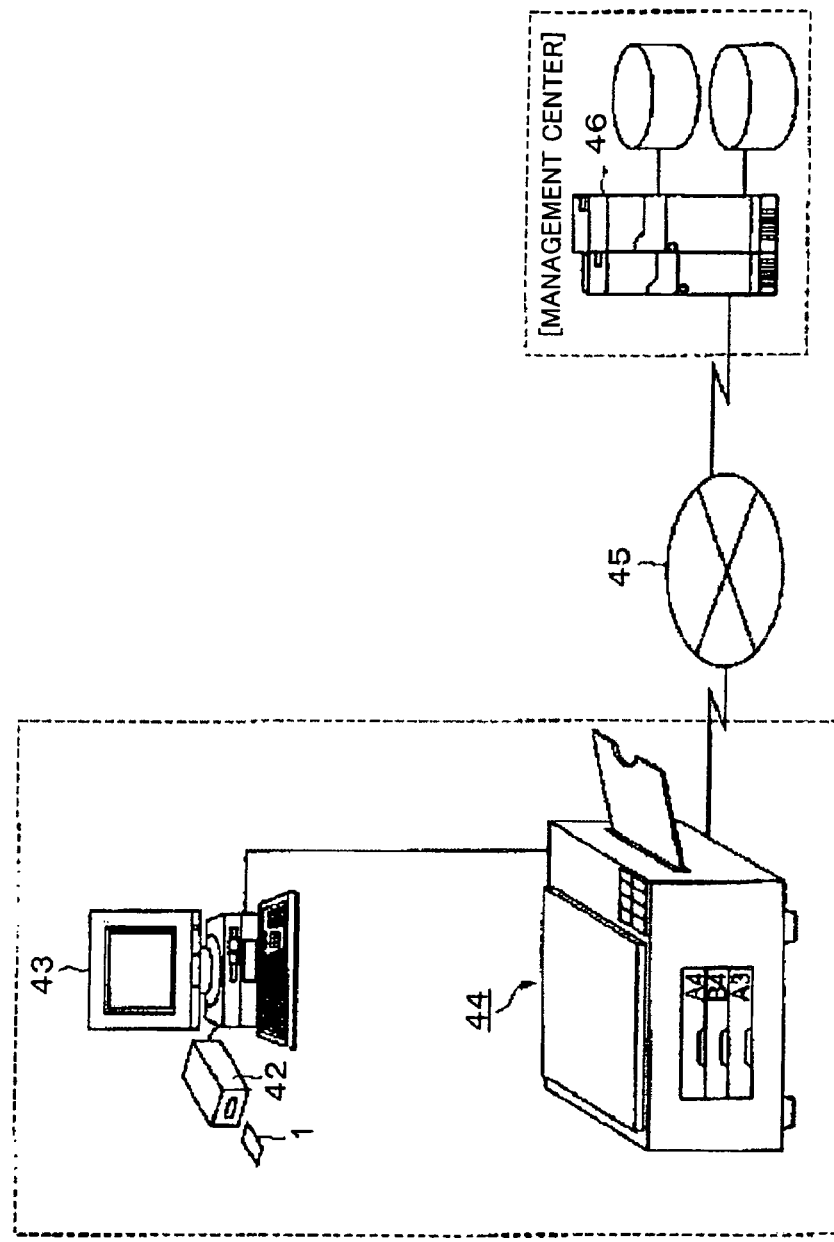
FIG. 8 is a diagram illustrating an overview of an output information management system according to a second embodiment of the present invention.
Figure 9:
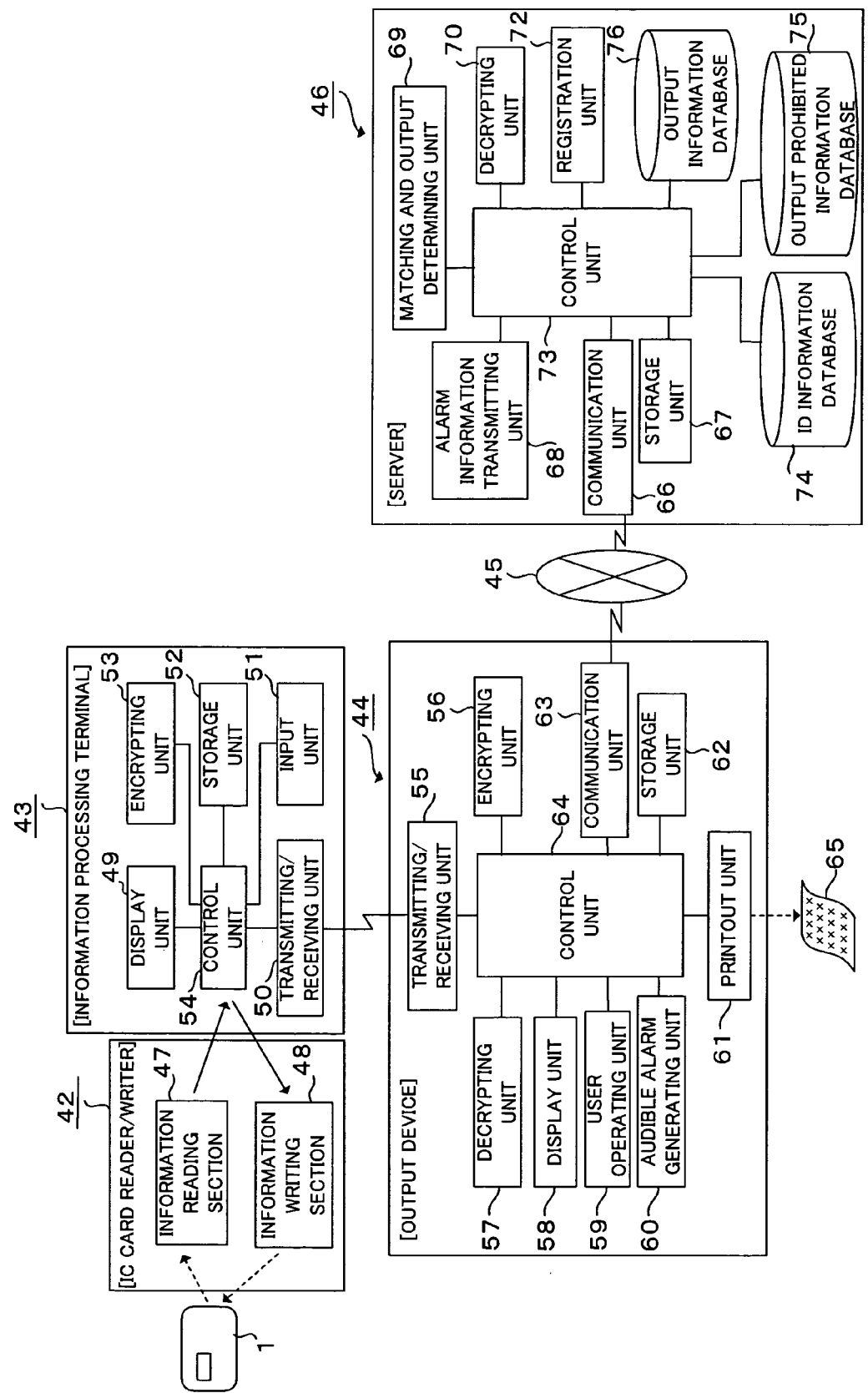
FIG. 9 is a system block diagram of the output information management system according to the second embodiment.
Figure 10:
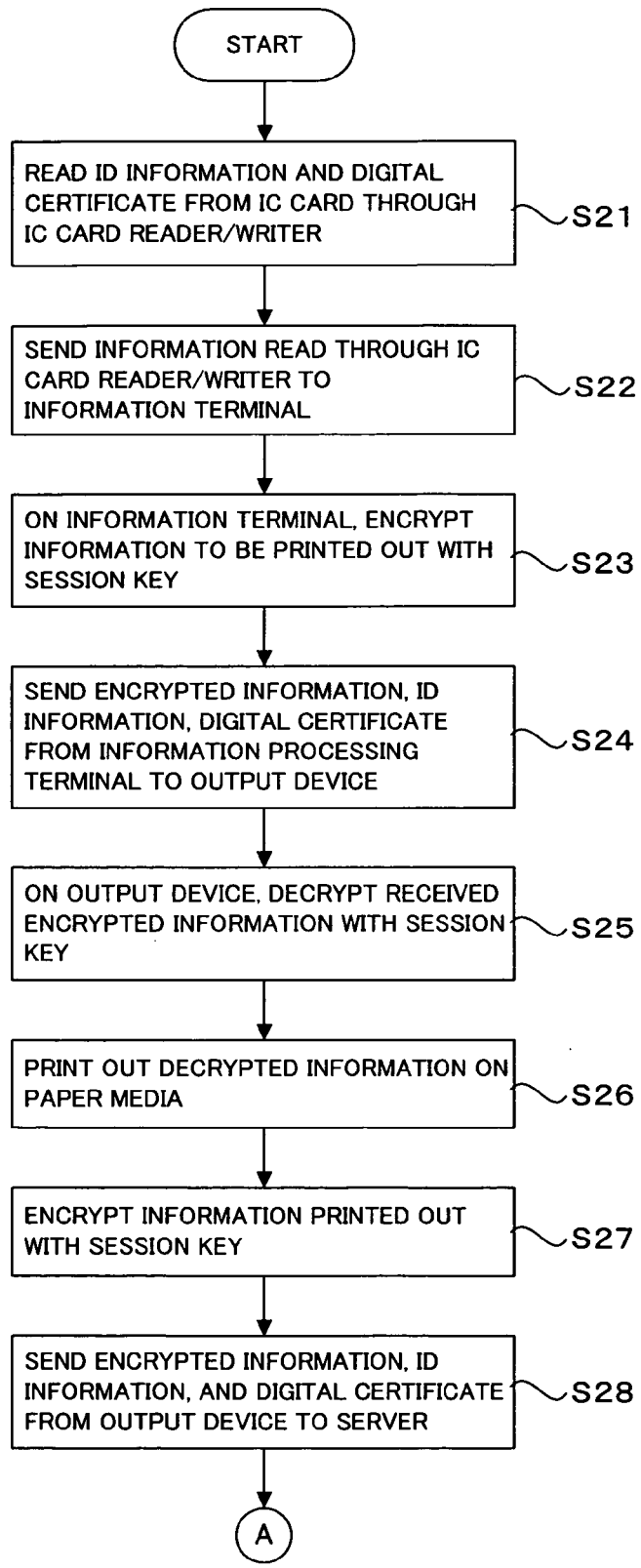
FIG. 10 is a flowchart of a process performed by the output information management system according to the second embodiment.
Figure 11:
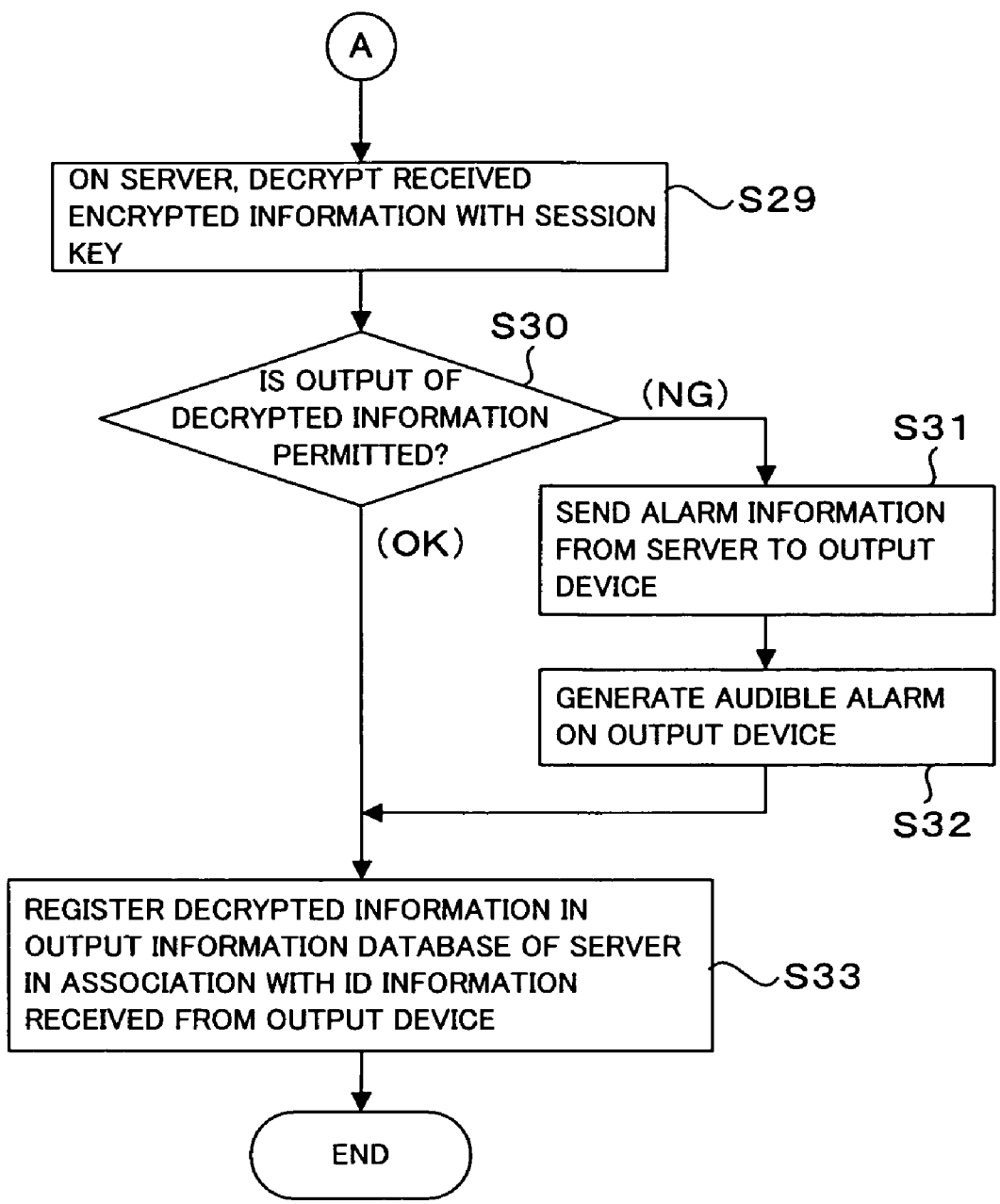
FIG. 11 is a flowchart of another process performed by the output information management system according to the second embodiment.

Referring to FIGS. 8 to 11, a second embodiment of the present invention will be described. FIG. 8 illustrates an overview of an output information management system according to the second embodiment of the present invention. FIG. 9 is a system block diagram of the output information management system according to the second embodiment of the present invention. FIGS. 10 and 11 are flowcharts of a process performed by the output information management system according to the second embodiment of the present invention.

[Output Information Management System]

Referring to FIGS. 8 and 9, an overview of the output information management system will be described first.

As shown in FIG. 8, the output information management system according to the second embodiment of the present invention includes an IC card 1, which is an information storage medium for a user, an information processing terminal 43, such as a personal computer, having an IC card reader/writer 42, an output device 44 such as a printer, which is connected so as to receive information from the information processing terminal 43 and which outputs information received from the information processing terminal 43 onto paper media, and a server 46 communicably connected with the output device 44 through the communication network 45.

In an organization such as a company, a number of employees work at desks with personal computers on them, on one floor of a building, for example. One or two output device 44 are installed in fixed places on the floor and shared among the employees. Each employee transmits information to be printed on the copying machine from his or her personal computer and prints out the information on paper, when needed.

Also in the system of this embodiment, a number of information processing terminals 43 such as personal computers are connected to a single output device 44 in a manner that they can transmit information to the output device 44 and multiple users can share the output device 44 to print out information. The sever 46, which is located at a management center, is connected to a number of output devices 44 through the communication network 45 and constitutes the system in a shareable manner.

Stored in the memory of the IC card 1 are ID information identifying the user of the IC card 1, a private (secret) key, and a digital certificate having a public key which is paired and used with the private key. The output device 44 and the server 46 also have their respective private keys and digital certificates.

The IC card read/writer 42 has an information reading section 47, which reads information stored on the IC card 1 and transmits it to the information processing terminal 43, and an information writer 48, which writes information on the IC card 1 from the information processing terminal 43.

As shown in FIG. 9, the information processing terminal 43, which may be a personal computer, includes a display unit 49, a transmitting/receiving unit 50, an input unit 51, a storage unit 52, an encrypting unit 53 and a control unit 54.

Information to be printed out on the output device 44 may be information inputted from the input unit 51 or information stored in the storage unit 52. Information to be printed out is encrypted with SSL for ensuring the security before being transmitted to the output device 44.

The encryption of information transferred between the information processing terminal 43 and the output device 44 is performed by the encrypting unit 53, and involves authentication through exchange between the IC card 1 and the output device 44 of their respective digital certificates, and sharing a session key (common key). The subsequent encryption of information is performed by using this session key.

A digital signature may be created with the private key contained in the user's IC card 1 and be transmitted together with the encrypted information.

The output device 44 includes a transmitting/receiving unit 55, an encrypting unit 56, a decrypting unit 57, a display unit 58, a user operating unit 59, an audible alarm generating unit 60, a printout unit 61, a storage unit 62, a communication unit 63, and a control unit 64.

The decrypting unit 57 has the function of decrypting encrypted information received at the output device 44 from the information processing terminal 43.

The printout unit 61 has the function of printing out information decrypted by the decrypting unit 57 on paper media 65.

The storage unit 62 stores the private key and digital certificate of the output device 44. A private key and digital certificate are stored in the storage unit of the server 46 as well. Information to be transmitted from the output device 44 to the server 46 is also encrypted with SSL. The information transmitted from the output device 44 to the server 46 is information transmitted from the information processing terminal 43 to the output device 44 and printed out on paper media 65 at the printout unit 61. This process is performed according to a control program stored in the storage unit 62.

The server 46 includes a communication unit 66, a storage unit 67, an alarm information transmitting unit 68, a matching and output determining unit 69, a decrypting unit 70, a registration unit 72, a control unit 73, an ID information database 74, an output prohibited information database 75, and an output information database 76.

Registered in the ID information database 74 are ID information stored on the IC card 1 and information identifying the user of the IC card 1, such as the employee number, name, department name, and job title of the user.

Registered in the output prohibited information database 75 is information prohibited to be printed out on the output device 44. Some users may be permitted to print out the output prohibited information and other users may be prohibited from outputting the output prohibited information, depending on the range of duty or job titles of the users associated with ID information.

The output information database 76 stores at anytime information to be printed out on the output device 44 in association with the ID information stored on the IC card 1 used by the user who printed out the information, as a registered history of use of the output device 44. Accordingly, who printed what kind of information can be identified from the information registered in the output information database 76 and the ID information database 74.

The registration unit 72 has the function of registering, in the output information database 76, printout information received at the server 46 from the output device 44 and decrypted by the decrypting unit 70, in association with ID information received together with the printout information.

The matching and output determining unit 69 has the function of matching printout information received at the server 46 from the output device 44 with the output prohibited information registered in the output prohibited information database 75 to determine whether the information is prohibited to be printed out. A specific method for determination made by the matching and output determining unit 69 as to whether output should be prohibited will be detailed later.

The alarm information transmitting unit 68 has the function of transmitting a signal, to the output device 44 from the server 46, for causing the audible alarm generating unit 60 of the output device 44 to generate an audible alarm, if the matching and output determining unit 69 determines that printout is prohibited.

The storage unit 67 contains a control program for controlling the way in which the controlling unit 73 controls the server's components.

[Output Determining Method]

A method performed by the matching and output determining unit 69 of the server 46 to determine whether output should be prohibited will be described below.

Information that the server 46 receives from an output device 44 in the second embodiment is print information decrypted by the decrypting unit 70, which may be image or text information. If the prohibited information list and output restricting tables as shown in FIGS. 3 to 5 are registered in the output prohibited information database 75, the same output determining method is used as that described in the first embodiment, and therefore the description of the method used in that case is omitted for convenience.

If the printout information is text information, a digital signature may be attached to the text information. A digital signature is a mechanism used for verifying identification of the author of an electronic document sent and received online, and is equivalent to a signature on a paper document. A digital certificate assures the identity of the holder of a public key used for the digital signature, and is issued by a third-party institution called a certification authority. If a digital signature is attached to text information, the department name and job title of the author of the text information can be identified by verifying the digital signature.

The matching and output determining unit 69 first identifies the department name and job title of the user from the ID information received from the output device 44 and ID information database 74. The matching and output determining unit 69 also checks the digital signature attached to the text information received from the output device 44 to identify the department and job title of the author of the text information. Then, the matching and output determining unit 69 can match the user's department name with the signer's department name. If they do not match, the matching and output determining unit 69 determines that the output should be prohibited. The matching and output determining unit 69 can also match the user's job title with the signer's job title. If the user's job title is in a lower rank than the signer's job title, the matching and output determining unit 69 determines that the output should not be permitted. By determining whether output should be permitted or not on the basis of the administrative authorities of a user and signer in this way, the server 46 can readily detect a person who tried to output information without authorization or a person who tried to output information belonging to a department to which the person does not belong.

[Output Information Managing Process]

A process performed by the output information management system according to the second embodiment of the present invention will be described with respect to the flowcharts shown in FIGS. 10 and 11.

First, an IC card 1 is set in the IC card reader/writer 42 and the ID information and digital certificate stored in the memory of the IC card 1 are read through the IC card reader/writer 42 (step S21). These items of information read through the IC card reader/writer 42 are transmitted to the information processing terminal 43 (step S22).

After information to be printed out on the output device 44 is identified on the information processing terminal 43, the information is encrypted with a session key shared by the information processing terminal 43 and the output device 44 by using SSL and is transmitted from the information processing terminal 43 to the output device 44 (steps S23 and S24).

On the output device 44, the information received from the information processing terminal 43 is decrypted with the session key shared by the information processing terminal 43 and the output device 44 (step S25). The decrypted information is printed out on paper media 65 by the printout unit 61 (step S26). The information printed out on the paper media 65 is encrypted by SSL with the session key shared by the output device 44 and the server 46 and then sent to the server 46 (steps S27 and S28).

On the server 46, received information is decrypted with the session key shared by the output device 44 and the server 46 (step S29). Whether the decrypted information is matched with output prohibited information registered in the output prohibited information database 75 is determined (step S30). If the matching shows that the information is output prohibited information (step S30: NG), the alarm information transmitting unit 68 of the server 46 transmits alarm information to the output device 44 (step S31). The output device 44 receives the alarm information and causes the audible alarm generating unit 60 to generate an audible alarm, indicating that information prohibited to be printed has been printed out (step S32).

On the server 46, the decrypted information and the ID information transmitted from the IC card reader/writer 42 are registered in the output information database 76 in association with each other (step S33). In this way, every information printed out on the output device 44 is registered in the output information database 76 in association with ID information. Thus, printout history information is recorded.

Information transmitted from the information processing terminal 43 to the output device 44 and information transmitted from the output device 44 to the server 46 are protected with SSL and therefore the security of the information is ensured.

Third Embodiment

Figure 12:
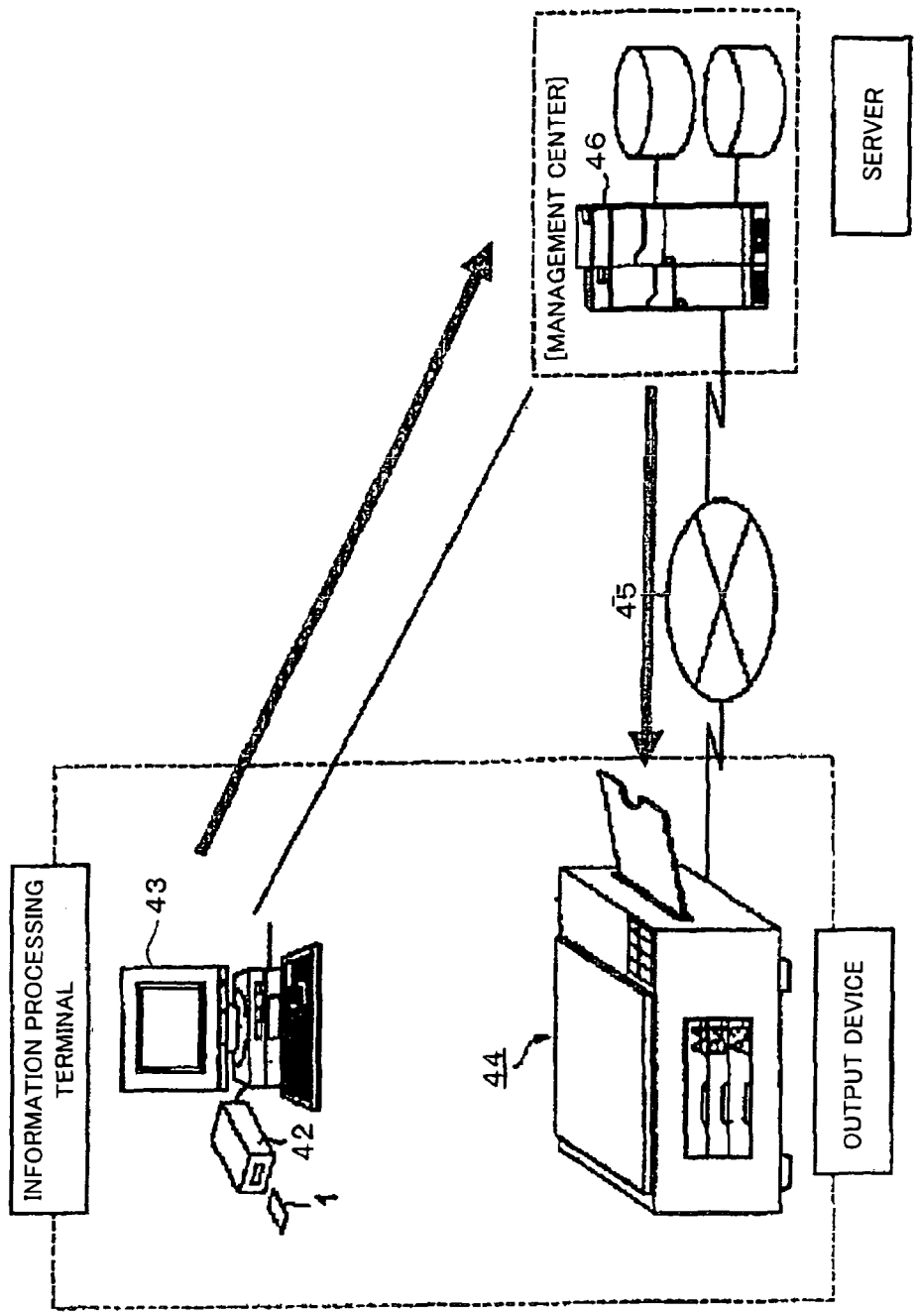
FIG. 12 is a diagram illustrating an overview of an output information management system according to a third embodiment of the present invention.
Figure 13:
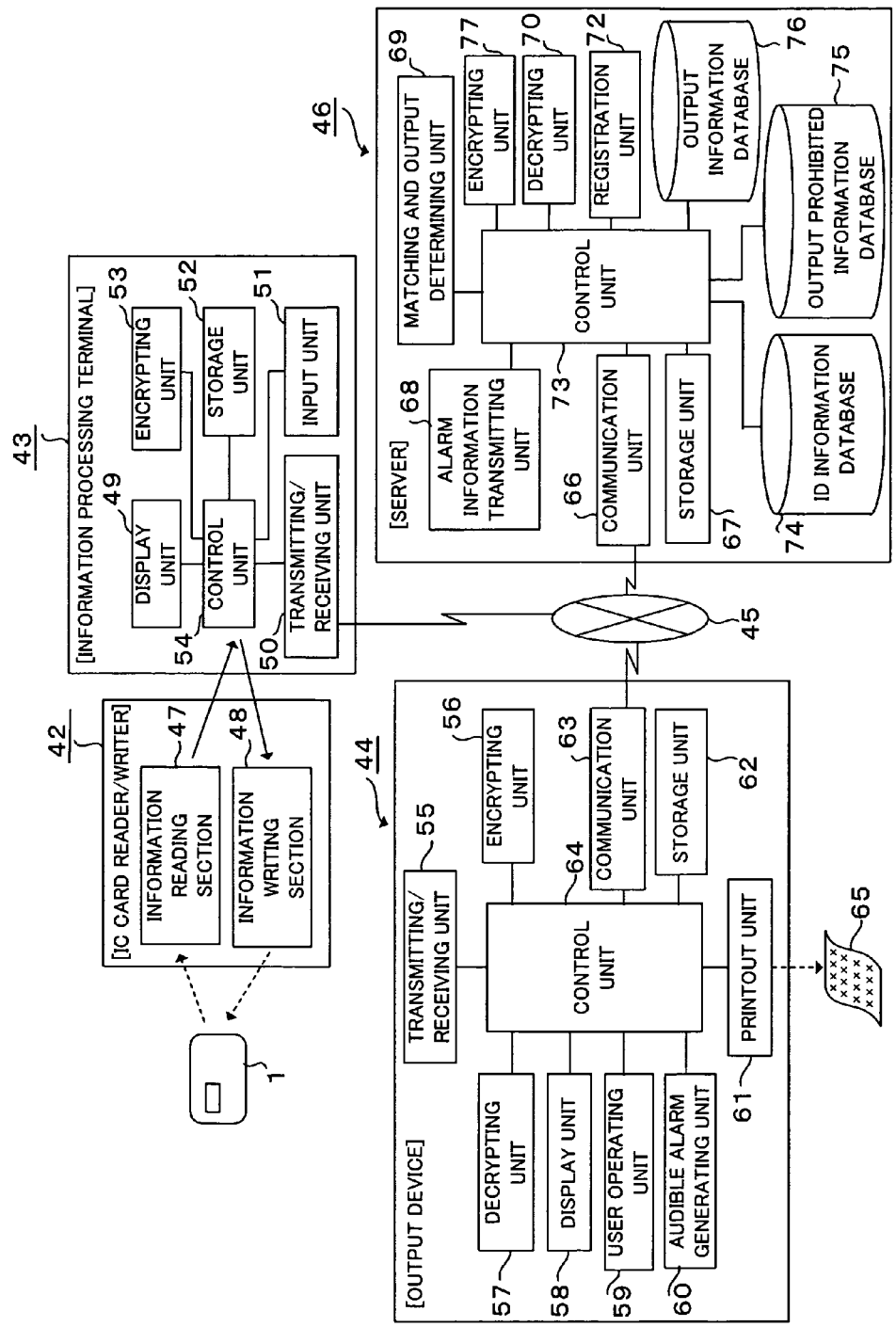
FIG. 13 is a system block diagram of the output information management system according to the third embodiment.
Figure 14:
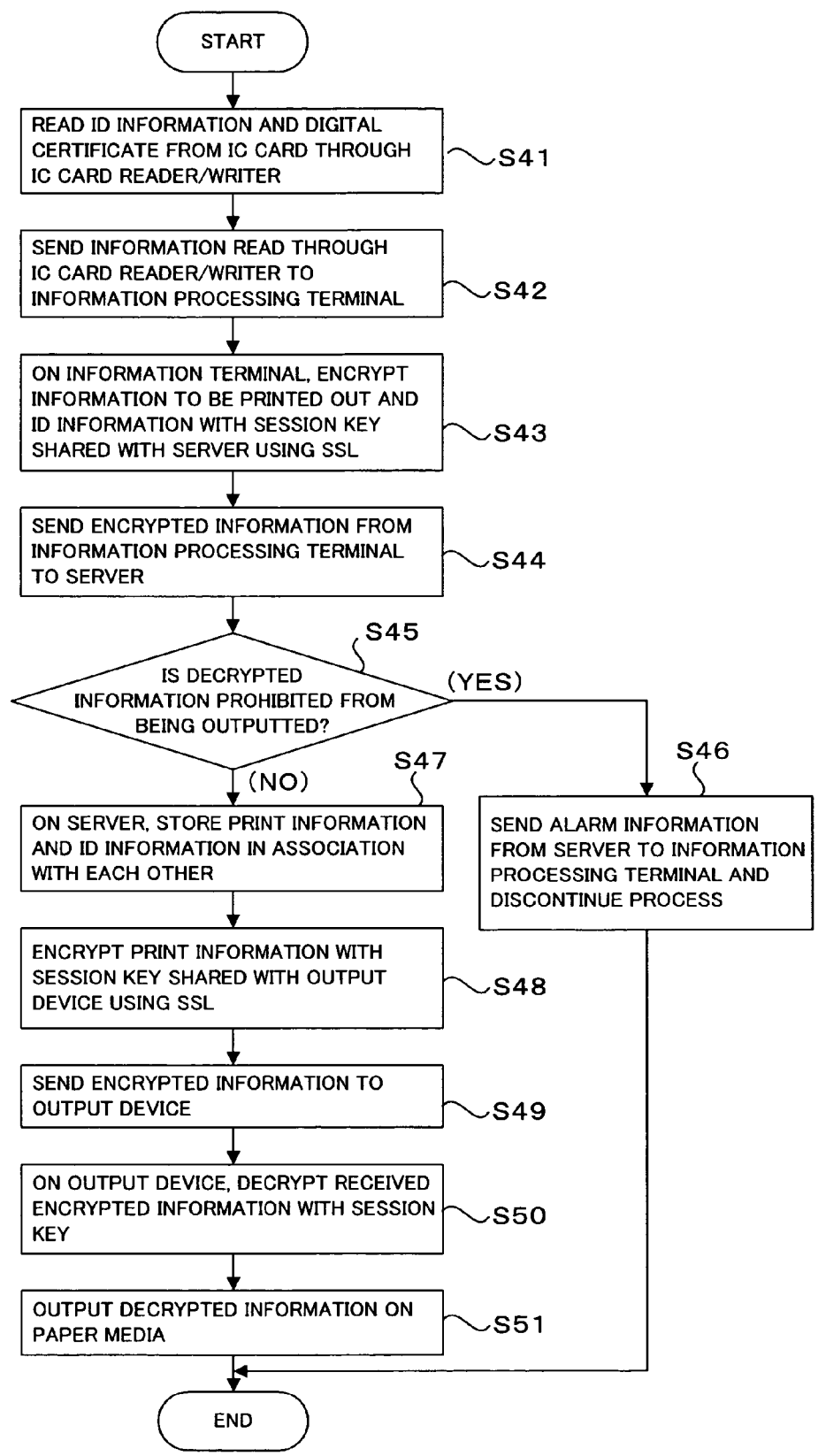
FIG. 14 is a flowchart of a process performed by the output information management system according to the third embodiment.

Referring to FIGS. 12 to 14, a third embodiment of the present invention will be described. FIG. 12 is a diagram illustrating an overview of an output information management system according to a third embodiment of the present invention. FIG. 13 is a system block diagram of the output information management system according to the third embodiment of the present invention. FIG. 14 is a flowchart of a process performed by the output information management system according to the third embodiment of the present invention.

[Output Information Management System]

An overview of the output information management system will be described first with reference to FIGS. 12 and 13.

As shown in FIG. 12, the output information management system according to the third embodiment of the present invention includes an IC card 1, which is an information storage medium for a user, an information processing terminal 43, such as a personal computer, having an IC card reader/writer 42, a server 46 which is connected so as to receive information from the information processing terminal 43 and which determines whether output of information received from the information processing terminal 43 should be permitted, and an output device 44, such as a printer, which is communicably connected with the server 46 through a communication network 45 and outputs information received from the information processing terminal 43 through the server 46 on paper media.

In FIG. 12, the information processing terminal 43 and the server 46 are interconnected through a dedicated line, and the server 46 and the output device 44 are interconnected through a communication network 45 such as the Internet. However, the present invention is not so limited; the information processing terminal 43, the output device 44, and the server 46 may be interconnected through the communication network 45 in such a manner that they can send and receive information to and from one another.

In an organization such as a company, a number of employees work at desks with personal computers on them, on one floor of a building, for example. One or two output device 44 are located in fixed places and shared among the employees. Each employee transmits information to be printed on the copying machine from his or her personal computer and print out the information on paper media, when needed.

Also in the system of this embodiment, a number of information processing terminals 43 such as personal computers are connected to a single output device 44 in a manner that they can transmit information and multiple users can share the output device 44 to print out information. The sever 46, which is located at a management center, is connected to a number of output devices 44 through the communication network 45 and constitutes the system in a shareable manner.

Stored in the memory of the IC card 1 are ID information identifying the user of the IC card 1, a private key, and a digital certificate having a public key which is paired and used with the private key. The output device 44 and the server 46 also have their respective private keys and digital certificates.

The IC card read/writer 42 has an information reading section 47, which reads information stored on the IC card 1 and transmits it to the information processing terminal 43, and an information writing section 48, which writes information on the IC card 1 from the information processing terminal 43.

As shown in FIG. 13, the information processing terminal 43, which may be a personal computer, includes a display unit 49, a transmitting/receiving unit 50, an input unit 51, a storage unit 52, an encrypting unit 53, and a control unit 54.

Information transmitted through the server 46 to the output device 44 and to be printed out on the output device 44 may be information inputted from the input unit 51 or information stored in the storage unit 52. Information to be printed out is encrypted with SSL for ensuring the security before being transmitted to the server 46.

The encryption of information transmitted between the information processing terminal 43 and server 46 is performed by the encrypting unit 53, and involves authentication through exchange between the IC card 1 and the server 46 of their respective digital certificates, and sharing a session key (common key). The subsequent encryption of information is performed by using this session key. A digital signature may be created with the private key contained in the user's IC card 1 and be sent together with the encrypted information.

The server 46 includes a communication unit 66, a storage unit 67, an alarm information transmitting unit 68, a matching and output determining unit 69, a decrypting unit 70, a registration unit 72, a control unit 73, an ID information database 74, an output prohibited information database 75, an output information database 76, and an encrypting unit 77.

Registered in the ID information database 74 are ID information stored in the IC card 1 and information, such as the employee number, name, department name, and job title, that identifies the user of the IC card, in association with each other.

Registered in the output prohibited information database 75 is information prohibited to be printed out on the output device 44. Some users may be permitted to print out the output prohibited information and other users may be prohibited from outputting the output prohibited information, depending on the range of duty or job titles associated with ID information.

The output information database 76 stores at anytime information printed out on the output device 44 in association with the ID information stored on the IC card 1 used by the user who printed out the information, as a registered history of use of the output device 44. Accordingly, who printed what kind of information can be identified from the information registered in the output information database 76 and the ID information database 74.

The registration unit 72 has the function of registering, in the output information database 76, printout information received at the server 46 from the information processing terminal 43 and decrypted by the decrypting unit 70, in association with ID information received together with the printout information. The decrypting unit 70 has the function of decrypting received, encrypted information. The decrypted information is printout information and ID information. Printout information is information that the user is attempting to output on the output device 44.

The matching and output determining unit 69 has the function of matching printout information received at the server 46 from the information processing terminal 43 with the output prohibited information registered in the output prohibited information database 75 to determine whether the information is prohibited to be outputted. If the matching and output determining unit 69 determines that the output should be permitted, the communication unit 66 of the server 46 transmits the printout information to the output device 44. On the other hand, if the matching and output determining unit 69 determines that the output should be prohibited, the control unit 73 of the server 46 performs control to prevent the printout information from being transmitted to the output device 44. A specific method for determination made by the matching and output determining unit 69 will be detailed later.

The alarm information transmitting unit 68 has the function of transmitting a signal, to the output device 44 from the server 46, for causing the audible alarm generating unit 60 of the output device 44 to generate an audible alarm, if the matching and output determining unit 69 determines that printout is prohibited. Alternatively, a message, instead of an audible alarm, indicating that the printout is prohibited may be transmitted as the alarm information.

The storage unit 67 contains a control program for controlling the way in which the controlling unit 73 controls the server's components. The storage unit 67 also contains the private key and digital certificate of the server 46. A private key and a digital certificate are stored in the storage unit of the output device 44 as well. Information transmitted from the server 46 to the output device 44 is also encrypted with SSL. The information transmitted from the server 46 to the output device 44 includes printout information, which is transmitted from the information processing terminal 43 to the server 46 and is permitted by the matching and output determining unit 69 to be outputted. This process is performed according to the control program stored in the storage unit 67.

The output device 44 includes a transmitting and receiving unit 55, an encrypting unit 56, a decrypting unit 57, a display unit 58, a user operating unit 59, an audible alarm generating unit 60, a printout unit 61, a storage unit 62, a communication unit 63, and a control unit 64.

The decrypting unit 57 has the function of decrypting encrypted printout information received at the output unit 44 from the server 46.

The printout unit 61 has the function of printing out information decrypted by the decrypting unit 57 on paper media 65.

[Output Determining Method]

The method performed by the matching and output determining unit 69 of the server 46 to determine whether output should be permitted is the same as in the first and second embodiments, and therefore the description of which is omitted for convenience.

It is assumed here that if determination is made with reference to an output restricting table as shown in FIG. 5, information that the server 46 receives from the information processing terminal 43 includes information that identifies the output device 44 on which information is to be outputted, such as the printer ID of the output device 44, namely the printer.

[Output Information Management Process]

A process performed by the output information management system according to the third embodiment of the present invention will be described below with reference to the flowchart shown in FIG. 14.

First, an IC card 1 is set in the IC card reader/writer 42 and the ID information and digital certificate stored in the memory of the IC card 1 are read through the IC card reader/writer 42 (step S41). These items of information read through the IC card reader/writer 42 are sent to the information processing terminal 43 (step S42).

After information to be printed out on the output device 44 is identified on the information processing terminal 43, the information is encrypted with a session key shared by the information processing terminal 43 and the server 46 by using SSL, and is transmitted from the information processing terminal 43 to the server 46 (steps S43 and S44). The information processing terminal 43 uses the session key shared with the server 46 by using SSL to encrypt the information.

On the server 46, information received from the information processing terminal 43 is decrypted with the session key shared by the information processing terminal 43 and the server 46. Whether the encrypted information is matched with output prohibited information registered in the output prohibited information database 75 is determined (step S45). If the matching shows that the information is output prohibited information (step S45: Yes), the alarm information transmitting unit 68 of the server 46 transmits alarm information to the output device 44 (step S46). The output device 44 receives the alarm information and causes the audible alarm generating unit 60 to generate an audible alarm, indicating that the information cannot be printed out because the information is prohibited to be printed out. In this case, the server 46 does not transmit the information received from the information processing terminal 43 to the output device 44.

On the other hand, if the matching shows that the information does not match any of the output prohibited information (step S45: No), the server 46 registers the decrypted information, namely the printout information, and the ID information transmitted from the IC card reader/writer 42 in the output information database 76, in association with each other (step S47). In this way, any information to be outputted on the output device 44 is registered in the output information database 76 in association with ID information. Thus, printout history information is recorded. The server 46 encrypts the printout information with the session key shared between the server 46 and the output device by using SSL before transmitting it to the output device 44 (steps S48 and S49). The server 46 performs the encryption with the session key which is shared with the output device 44 using SSL. Because any information transferred over the communication network 45 is protected with SSL, the security thereof is ensured.

Then, on the output device 44, the information received from the server 46 is decrypted with the session key shared between the server 46 and the output device 44 (step 50). The decrypted information is printed out onto paper media 65 by the printing out unit 61 (step S51). With this, the output information management process ends.

Fourth Embodiment

Figure 15:
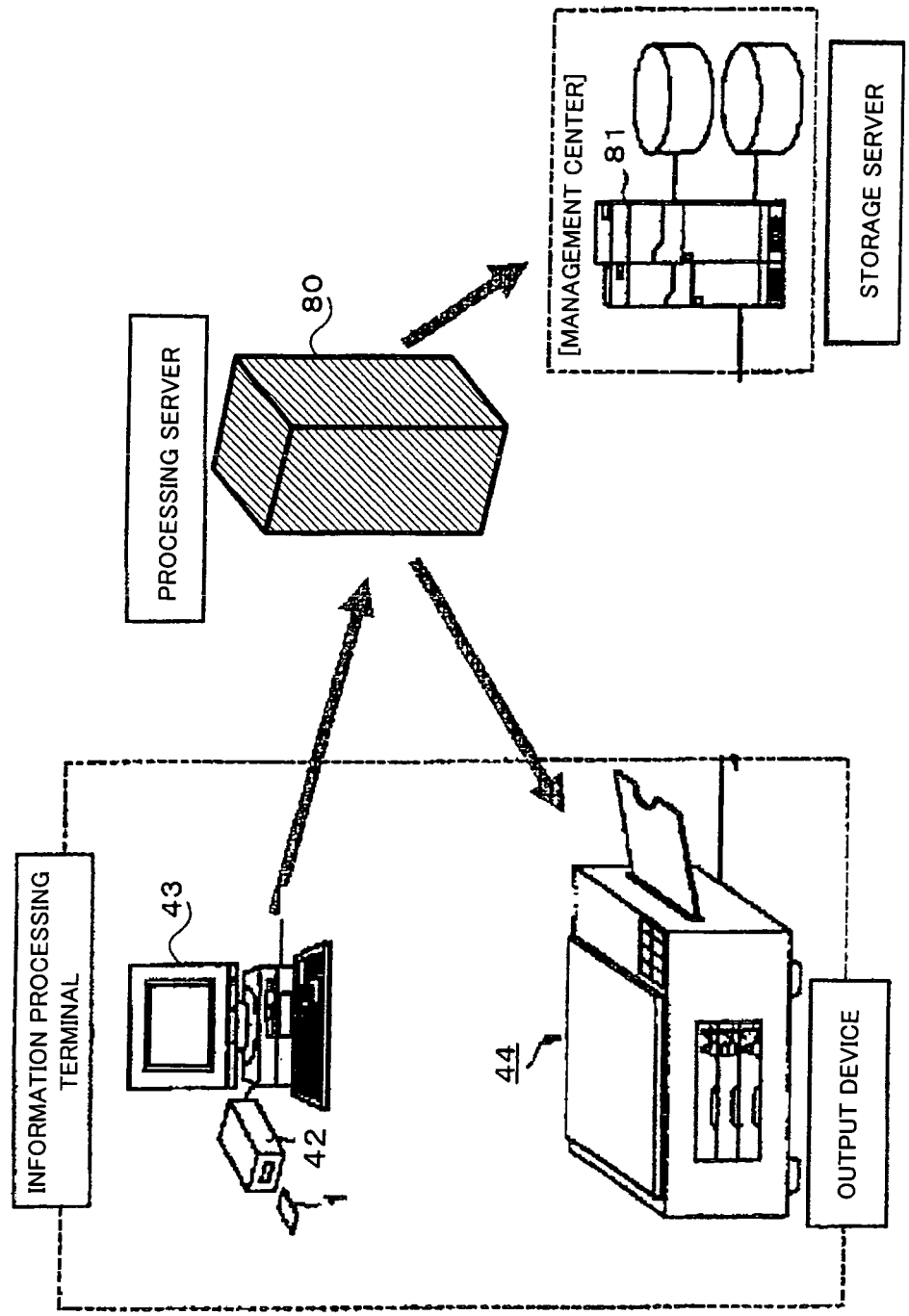
FIG. 15 is a diagram illustrating an overview of an output information management system according to a fourth embodiment of the present invention.
Figure 16:
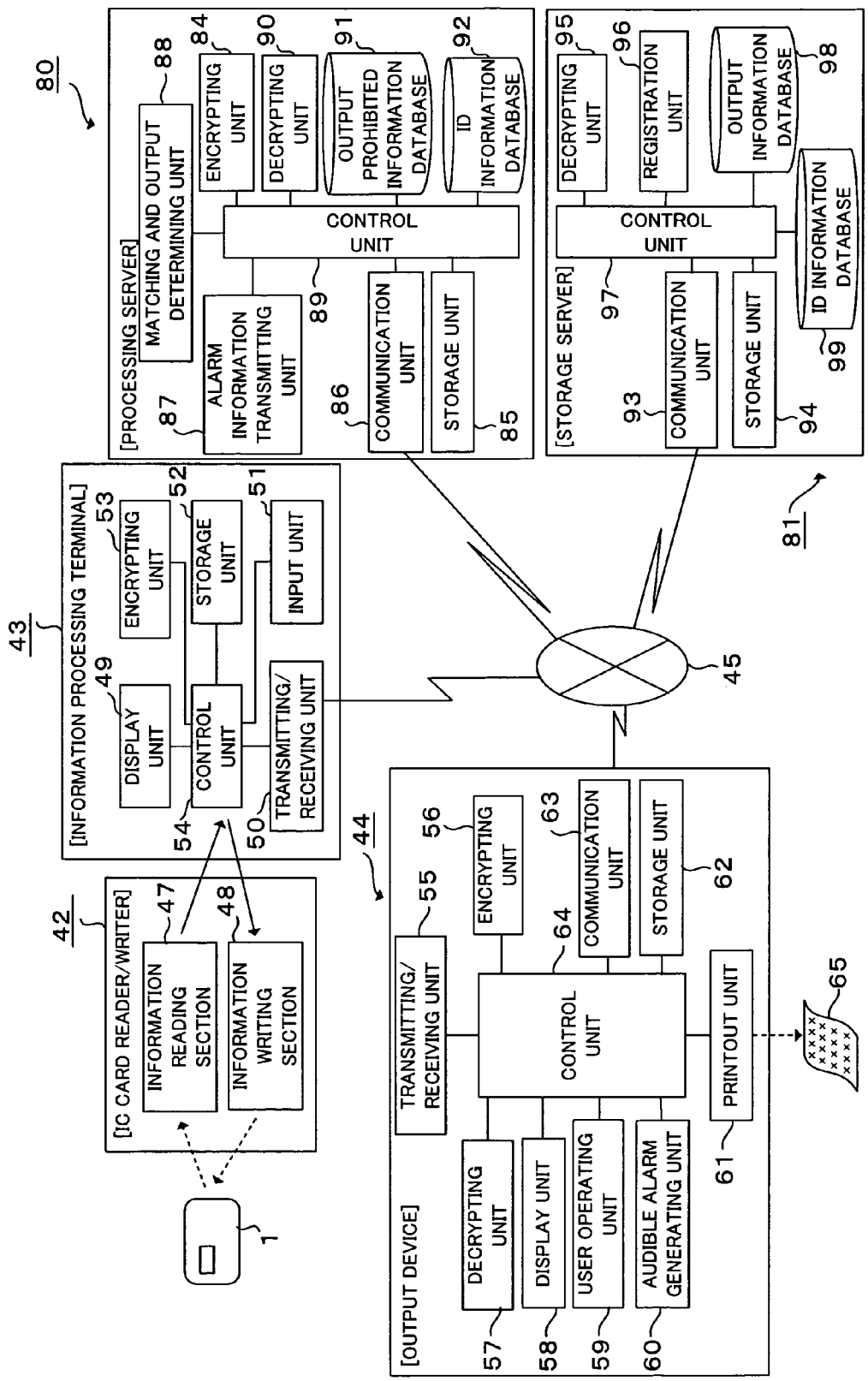
FIG. 16 is a system block diagram of the output information management system according to the fourth embodiment.

Referring to FIGS. 15 to 17, a fourth embodiment of the present invention will be described. FIG. 15 is a diagram illustrating an overview of an output information management system according to the fourth embodiment of the present invention. FIG. 16 is a system block diagram of the output information management system according to the fourth embodiment of the present invention. FIG. 17 is a flowchart of a process performed by the output information management system according to the fourth embodiment of the present invention.

[Output Information Management System]

An overview of the output information management system will be described first with reference to FIGS. 15 and 16. As shown in FIG. 15, the output information management system according to the fourth embodiment of the present invention includes an IC card 1, which is an information storage medium for a user, an information processing terminal 43, such as a personal computer, having an IC card reader/writer 42, a processing server 80, which is connected to the information processing terminal 43 in a manner that they can communicate with each other and which determines whether output of information received from the information processing terminal 43 should be permitted or not, and an output device 44 such as a printer, which is connected with the processing server 80 so as to be capable of receiving information from the processing server 80, and outputs information received from the information processing terminal 43 through the server 80 on paper media. The output information management system also includes a storage server 81 connected in such a manner that it can receive information from the processing server 80 for managing information printed out by the output device 44.

While the information processing terminal 43 and processing server 80, the processing server 80 and output device 44, and the processing server 80 and the storage server 81 are connected through dedicated lines, respectively, in FIG. 15, the present invention is not so limited. The information processing terminal 43, output device 44, processing server 80, and storage server 81 may be connected through a communication network 45 as shown in FIG. 15 so that they can send and receive to and from one another.

In an organization such as a company, a number of employees work at desks with personal computers on the desk, on one floor of a building, for example. One or two output devise 44 are located in fixed places and shared among the employees. Each employee transmits information to be printed on the printer from his or her personal computer to print out the information on paper media, when needed.

Also in the system of this embodiment, a number of information processing terminals 43 such as personal computers are connected to a single output device 44 in a manner they can transmit information to the output device 44 and multiple users can share the output device 44 to print out information. In this system, the processing server 80 is located in one place as a central server and one storage server is located on each floor, which can be shared among multiple information processing terminals 43 and output devices 44. Because the storage servers 81 are provided separately from the processing server 80 in this way, the function of determining whether output of printer information should be permitted can be implemented centrally on the processing server 80 and the function of storing outputted printer information as a history, which requires a large amount of memory, can be implemented on the multiple servers in a distributed manner.

Stored on the memory of the IC card 1 are ID information identifying the user of the IC card 1, a private key, and a digital certificate having a public key pared with the private key. The output devices 44, processing server 80, and storage servers 81 also have their private keys and digital certificates.

The IC card reader/writer 42 has an information reading section 47, which reads information stored on the IC card 1 and transmits it to an information processing terminal 43, and an information writing section 48, which writes information from the information processing terminal 43 onto the IC card 1.

As shown in FIG. 16, the information processing terminal 43, which may be a personal computer, includes a display unit 49, a transmitting/receiving unit 50, an input unit 51, a storage unit 52, an encrypting unit 53, and a control unit 54.

Information to be printed out on the output device 44 through the server 46 may be information inputted from the input unit 51 or information stored in the storage unit 52. The information to be printed out is encrypted with SSL for ensuring security before being transmitted to the processing server 80.

The encryption of information of information transmitted between the information processing terminal 43 and the processing server 80 is performed by an encrypting unit 53, and involves authentication through exchange between the IC card 1 and the processing server 80 of their respective digital certificates, and sharing a session key (common key). The subsequent encryption of information is performed by using this session key. A digital signature may be created with the private key contained in the user's IC card 1 and be transmitted together with the encrypted information.

The processing server 80 includes an encrypting unit 84, a storage unit 85, a communication unit 86, an alarm information transmitting unit 87, a matching and output determining unit 88, a control unit 89, a decrypting unit 90, an output prohibited information database 91, and an ID information database 92.

Registered in the ID information database 92 are ID information stored on the IC card 1, information identifying the user of the IC card 1, such as the employee number, name, department name, and job title of the user, in association with each other.

Registered in the output prohibited information database 91 are information prohibited to be printed out on the output device 44. Some users may be permitted to print out the output prohibited information and other users may be prohibited from outputting the output prohibited information, depending on the range of duty or job titles of the users associated with ID information.

The matching and output determining unit 88 has the function of matching printout information received from the information processing terminal 43 at the processing server 80 with output prohibited information registered in the output prohibited information database 91. If the matching and output determining unit 88 determines that the output should be permitted, the communication unit 86 of the processing server 80 transmits the printout information to the output device 44. The communication unit 86 of the processing server 80 also transmits the printout information and ID information to the storage server 81. On the other hand, if the matching and output determining unit 88 determines that the output should be prohibited, the control unit 89 of the server 80 performs control to prevent the printout information from being transmitted to the output device 44. A specific determination method performed by the matching and output determining unit 88 will be detailed later.

The alarm information transmitting unit 87 has the function of transmitting a signal from the processing server 80 to the output device 44 to cause the alarm generating unit 60 of the output device 44 to generate an audible alarm if the determination by the matching and output determining unit 88 determines that the printout of the information should be prohibited. Alternatively, a message, instead of an audible alarm, indicating that the printout is prohibited may be transmitted as the alarm information.

The storage unit 85 contains a control program for controlling the way in which the controlling unit 89 controls the server's components. The storage unit 85 also contains the private key and digital certificate of the processing server 80. A private key and a digital certificate are stored in the storage unit of each of the output devices 44 and storage servers 81 as well.

Information transmitted from the server 80 to the output device 44 is also encrypted with SSL. The information transmitted from the server 80 to the output device 44 includes printout information, which is transmitted from the information processing terminal 43 to the server 80 and is permitted by the matching and output determining unit 88 to be outputted. Information to be transmitted from the processing server 80 to a storage server 81 is also encrypted with SSL. The information transmitted from the processing server 80 to the storage server 81 includes printout information permitted by the matching and output determining unit 88 to be outputted and the ID information of the user. This process is performed according to the control program stored in the storage unit 85.

The storage server 81 includes a communication unit 93, a storage unit 94, a decrypting unit 95, a registration unit 96, a control unit 97, an output information database 98, and an ID information database 99.

Like the ID information databases described above, the ID information database 99 contains the ID information stored on the IC card 1 and information identifying the user of the IC card 1, such as the employee number, name, department name, and job title, in association with each other.

The output information database 98 stores at anytime information to be printed out on the output device 44 in association with the ID information stored on the IC card 1 used by the user who printed the information, as a registered history of use of the output device 44. Accordingly, who printed what kind of information can be identified from the information registered in the output information database 98 and the ID information database 99.

The registration unit 96 has the function of registering printout information which is sent from the information processing terminal 43 and received at the storage sever 81 through the processing server 80 and decrypted by the decrypting unit 95, and ID information received concurrently with the printout information, in the output information database 98 in association with each other. The decrypting unit 95 has the function of decrypting received encrypted information. The decrypted information is printout information and ID information. Printout information is information that the user is attempting to output on the output device 44.

The output device 44 includes a transmitting/receiving unit 55, an encrypting unit 56, a decrypting unit 57, a display unit 58, a user operating unit 59, an audible alarm generating unit 60, a printout unit 61, a storage unit 62, a communication unit 63, and a control unit 64.

The decrypting unit 57 has the function of decrypting encrypted printout information transmitted from the processing server 80 and received at the output device 44.

The printout unit 61 has the function of printing out information decrypted by the decrypting unit 57 on paper media 65.

[Output Determining Method]

The method performed by the matching and output determining unit 88 of the processing server 80 for determining whether output should be permitted is the same as in the first and second embodiments, and therefore the description of which is omitted for convenience.

[Output Information Management Process]

A process performed by the output information management system according to the fourth embodiment of the present invention will be described below with reference to the flowchart shown in FIG. 17.

First, an IC card 1 is set in the IC card reader/writer 42 and the ID information and digital certificate stored in the memory of the IC card 1 are read through the IC card reader/writer 42 (step S61). The items of information read through the IC card reader/writer 42 are transmitted to the information processing terminal 43 (step S62).

After information to be printed out on the output device 44 is identified on the information processing terminal 43, the information is encrypted with a session key shared by the information processing terminal 43 and the processing server 80 by using SSL and is transmitted from the information processing terminal 43 to the processing server 80 (steps S63 and S64). The information processing terminal 43 uses the session key shared with the processing server 80 using SSL to encrypt the information.

On the processing server 80, information received from the information processing terminal 43 is decrypted with the session key shared between the information processing terminal 43 and the processing server 80 (step S65). Whether the encrypted information is matched with output prohibited information registered in the output prohibited information database 91 is determined (step S66). If the matching shows that the information is output prohibited information (step S66: Yes), the alarm information transmitting unit 87 of the processing server 80 transmits alarm information to the output device 44 (step S67). The output device 44 receives the alarm information and causes the audible alarm generating unit 60 to generate an audible alarm, indicating that the information cannot be printed out because the information is prohibited to be printed out. In this case, the processing server 80 does not transmit the information received from the information processing terminal 43 to the output device 44.

On the other hand, if the matching shows that the information does not match any of the output prohibited information (step S66: No), the encrypting unit 84 of the processing server 80 encrypts the decrypted information, namely the printout information, and the ID information transmitted from the IC card reader/writer 42 with a session key shared with the storage server 81 using SSL (step S68). The communication unit 86 of the processing server 80 transmits the encrypted printout information and ID information to the storage server 81 through the communication network 45 (step S69). On the storage server 81, the decrypting unit 95 decrypts the information received from the processing server 80 with a session key shared between the processing server 80 and the storage server 81 (step S70). The registration unit 96 of the storage server 81 registers the decrypted printout information and ID information in the output information database 98 in association with each other (step S71).

On the other hand, if the matching shows that the information does not match any of the output prohibited information (step S67: Yes), the encrypting unit 84 of the processing server 80 encrypts the decrypted printout information with a session key shared with the output device 44 using SSL (step S72). The communication unit 86 of the processing server 80 transmits the encrypted printout information to the output device 44 (step S73). Any information transmitted over the communication network 45 is protected with SSL in this way and therefore the security of the information is ensured.

On the output device 44, the information received from the processing server 80 is decrypted with the session key shared between the processing server 80 and the output device 44 (step S74). The encrypted information is printed out by the printout unit 61 on paper media 65 (step S75). With this, the output information management process ends.

[Variations]

While only printer output information that has permitted by the server 46 or the processing server 80 to be outputted is stored in the output information database in association with ID information in the third and fourth embodiments, the present invention is not so limited. Any information received from the information processing terminal 43 may be stored in association with ID information. According to this variation, printer output information that has not actually been outputted on the output device 44 is also stored and accordingly information about a user who has tried to illegally output information can be stored.

While IC cards are used as the information storage media that store ID information of the user in the first to fourth embodiments described above, the present invention is not limited to IC cards. Any of various media that are capable of storing personal information about users can be used. For example, cellular phones and PDAs (Personal Digital Assistants) having information storage media on which personal information about users can be used.

Furthermore, ID information stored on IC cards is read through an IC card reader/writer 42 in the first to fourth embodiments, the present invention is not so limited. ID information stored on predetermined information storage media may be obtained by wireless communication using Bluetooth (registered trademark) or other techniques. That is, the information storage media in the present invention include any media on which information about users can be stored and terminals having such media.

INDUSTRIAL APPLICABITLITY

The output information management system according to the present invention can be used in a wide variety of applications in places, such as companies and governmental offices where devices that output information are provided.

The invention claimed is:

1. An output information management system including an information storage medium, an information processing terminal having a reader/writer capable of reading information stored on the information storage medium, a server connected with the information processing terminal so as to be capable of receiving information from the information processing terminal and communicably connected to the output device separated from the server, and an output device which outputs information received from the information processing terminal through the server onto paper media, the information storage medium having a memory on which ID information identifying a user is stored;

the reader/writer having a reading section for reading ID information stored on the information storage medium;

the information processing terminal having a unit which transmits the ID information read by the reader/writer and output information to be outputted onto paper media on the output device to the server;

the server comprising:

an output determining information database in which output prohibited information prohibited to be outputted on the output device or output permitted information permitted to be outputted on the output device is registered;

a matching unit which matches output information received from the information processing terminal with the information registered in the output determining information database;

an alarm information transmitting unit which does not transmit the output information and transmits an alarm information to the output device if the matching unit determines as the result of the matching that the output information received from the information processing terminal matches the output prohibited information or does not match the output permitted information;

an output information transmitting unit which transmits the output information to the output device if the matching unit determines as the result of the matching that the information received from the information processing terminal does not match the output prohibited information or matches the output permitted information;

an output information database which stores the ID information received from the information processing terminal, the output information, the device identification information of the output device and an information about outputted time in association with each other, even after the output device outputs information onto paper media; and a unit which stores the ID information received from the information processing terminal and the output information transmitted to the output device by the output information transmitting unit, in association with each other, in the output information database.

2. The output information management system according to claim 1, wherein:

the output determining information database stores the output prohibited information or the output permitted information on an individual output device basis;

the matching unit matches information received from the information processing terminal with the output prohibited information associated with the output device on which the information is to be outputted or with the output permitted information associated with the output device on which the information is to be outputted.

3. The output information management system according to claim 1, wherein the information storage medium is an IC card.

4. An output information management system including an information storage medium, an information processing terminal having a reader/writer capable of reading information stored on the information storage medium, a processing server connected with the information processing terminal so as to be able to receive information from the information processing terminal and communicably connected with the output device, a storage server separated from the output device and which stores information permitted by the processing server to be outputted, and an output device which outputs information received from the information processing terminal through the processing server onto paper media, the information storage medium having a memory on which ID information identifying a user is stored;

the reader/writer having a reading section for reading the ID information stored on the information storage medium;

the information processing terminal having a unit which transmits the ID information read by the reader/writer and output information to be outputted onto paper media to the processing server;

the processing server comprising:

an output determining information database in which output prohibited information prohibited to be outputted on the output device or output permitted information permitted to be outputted on the output device is registered;

a matching unit which matches output information received from the information processing terminal with the information registered in the output determining information database;

an alarm information transmitting unit which does not transmit the output information and transmits alarm information to the output device if the matching unit determines as the result of the matching that the output information received from the information processing terminal matches the output prohibited information or does not match the output permitted information; and a transmitting unit which transmits the output information to the output device and transmits the output information and the ID information to the storage server if the matching unit determine as the result of the matching that the output information received from the information processing terminal does not match the output prohibited information or matches the output permitted information;

the storage server comprising:

an output information database in which ID information received from the information processing terminal, output information, a device identification information of the output device, and an information about outputted time in association with each other; and a unit which stores the ID information received from the processing server in association with the output information, the device identification information of the output device and the information about outputted time in the output information database, even after the output device outputs information onto paper media.

* * * * *